(12) United States Patent
Baldwin et al.

(10) Patent No.: US 10,834,310 B2
(45) Date of Patent: Nov. 10, 2020

(54) MULTI-CAMERA POST-CAPTURE IMAGE PROCESSING

(71) Applicant: QUALCOMM Incorporated, San Diego, CA (US)

(72) Inventors: Cullum James Baldwin, San Diego, CA (US); Pasi Johannes Parkkila, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 15/678,691

(22) Filed: Aug. 16, 2017

(65) Prior Publication Data

US 2019/0058826 A1 Feb. 21, 2019

(51) Int. Cl.
*H04N 5/232* (2006.01)
*G06T 11/60* (2006.01)
*H04N 5/225* (2006.01)

(52) U.S. Cl.
CPC ......... *H04N 5/23216* (2013.01); *G06T 11/60* (2013.01); *H04N 5/2258* (2013.01); *H04N 5/23232* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 8,553,106 B2 | 10/2013 | Scarff | |
| 9,058,699 B2 | 6/2015 | Jonsson | |
| 9,185,291 B1 | 11/2015 | Shabtay et al. | |
| 9,241,111 B1 | 1/2016 | Baldwin | |
| 9,262,854 B2 | 2/2016 | Daisy et al. | |
| 9,325,899 B1 | 4/2016 | Chou et al. | |
| 9,426,365 B2 | 8/2016 | Laroia et al. | |
| 9,497,380 B1* | 11/2016 | Jannard | H04N 5/23238 |
| 9,531,952 B2 | 12/2016 | Snavely et al. | |
| 2008/0030592 A1 | 2/2008 | Border et al. | |
| 2011/0018970 A1* | 1/2011 | Wakabayashi | H04N 5/2251 348/47 |

(Continued)

FOREIGN PATENT DOCUMENTS

| | | | | |
|---|---|---|---|---|
| WO | 2014199338 A2 | 12/2014 | | |
| WO | WO-2014199338 A2 * | 12/2014 | ........... | H04N 5/2258 |

(Continued)

OTHER PUBLICATIONS

International Search Report and Written Opinion—PCT/US2018/040610—ISA/EPO—dated Sep. 25, 2018.

*Primary Examiner* — Heather R Jones
(74) *Attorney, Agent, or Firm* — QUALCOMM Incorporated

(57) ABSTRACT

Image processing can include storing a first image of a scene captured by a first camera, storing a second image of the scene captured by a second camera, and storing a first user-composed image. The first user-composed image can be derived from at least one of: (a) the first image and (b) the second image. The image processing can further include: receiving a second command to edit the first user-composed image, editing the first user-composed image, and saving the edited first user-composed image as a second user-composed image.

34 Claims, 11 Drawing Sheets

(56) References Cited

U.S. PATENT DOCUMENTS

| | | | |
|---|---|---|---|
| 2011/0242369 A1* | 10/2011 | Misawa | H04N 5/2258 |
| | | | 348/240.2 |
| 2012/0074227 A1* | 3/2012 | Ferren | G02B 13/0065 |
| | | | 235/462.21 |
| 2017/0109912 A1 | 4/2017 | Lee et al. | |
| 2017/0150067 A1 | 5/2017 | Han | |
| 2018/0160046 A1* | 6/2018 | Nash | H04N 5/23296 |

FOREIGN PATENT DOCUMENTS

| | | | |
|---|---|---|---|
| WO | 2016013902 A1 | 1/2016 | |
| WO | WO-2016013902 A1 * | 1/2016 | H04N 5/06 |

* cited by examiner

MULTI-CAMERA POST-CAPTURE IMAGE PROCESSING

CROSS-REFERENCE TO RELATED APPLICATIONS

None.

STATEMENT ON FEDERALLY SPONSORED RESEARCH OR DEVELOPMENT

None.

BACKGROUND

Field of the Disclosure

The present disclosure relates, among other things, to recomposing digital images of a scene.

Description of Related Art

Mobile devices typically include a camera for imaging a scene. The camera includes an optical assembly, having lenses and apertures, that directs light from the scene onto an image sensor. The image sensor measures the focused light and a processor saves the measurements as an image file.

Configuration of the optical assembly determines how light from the scene is focused onto the image sensor. For example, configuration of the optical assembly determines the image's (a) field of view and (b) level of zoom. Field of view relates to the quantity of scene area captured in the image. Level of zoom relates the quality of the captured scene area.

For example, a user can take a take a panoramic image of a city skyline and a telescopic image of a specific building in the skyline. Assuming that both images have equal resolution, the panoramic image will have a wide field of view, thus showing many different buildings, but a low level of zoom such that specific details (e.g., windows) of the many different buildings are absent. In contrast, the telescopic image will have a narrow field of view, thus showing, perhaps, only a single building, but at a high level of zoom such that specific details (e.g., windows) of the single building are present.

In certain instances, a user may wish to recompose field of view and/or level of zoom post-capture. For example, after taking the panoramic image, the user may wish to view a specific building's details. Or, after taking the telescopic image, the user may wish to view neighboring buildings.

SUMMARY

A method for imaging processing is disclosed. The method can include: storing, in response to a first command, a first image of a scene captured by a first camera, the first image comprising first pixels; storing, in response to the first command, a second image of the scene captured by a second camera, the second image comprising second pixels; storing, in response to the first command, a first user-composed image of the scene, the first user-composed image comprising first user-composed pixels derived from at least one of: (a) the first pixels and (b) the second pixels.

The method can include: receiving a second command to edit the first user-composed image; editing the first user-composed image; saving the edited first user-composed image as a second user-composed image.

The method can include saving the first user-composed image and the second user-composed image as metadata. Upon accessing the metadata, the first user-composed image can be rendered and/or the second user-composed image can be rendered.

Rendering the first user-composed image can include re-deriving the first user-composed pixels from the first and/or second pixels. Rendering the second user-composed image can include re-deriving the second user-composed pixels from the first pixels and/or the second pixels. The metadata can map the first user-composed image to the first and/or second image. The metadata can map the second user-composed image to the first image and/or the second image.

According to the method, the first user-composed image and the second user-composed image can have a same field of view and level of zoom. In this case, the first user-composed image be derived from the first image, but not the second image. The second user-composed image can be derived from both the first and second image due to a photoeffect applied to the second user-composed image.

The method can include presenting a thumbnail of the first user-composed image. The thumbnail can be a downsample of the first user-composed image and automatically appear in response to the first command. The first command can consist of a single capture command. A thumbnail of the second user-composed image can automatically replace the thumbnail of the first user-composed image in response to the save the edited first user-composed image.

A processing system is disclosed, which can include one or more processors configured to perform the method. A non-transitory computer readable medium is disclosed. The medium can include program code, which, when executed by one or more processors, causes the one or more processors to perform operations. The program code can include code for performing the method.

A processing system is disclosed. The processing system can include one or more processors configured to: store, in response to a first command, a first image of a scene captured by a first camera, the first image comprising first pixels; store, in response to the first command, a second image of the scene captured by a second camera, the second image comprising second pixels; store, in response to the first command, a first user-composed image of the scene, the first user-composed image comprising first user-composed pixels derived from at least one of: (a) the first pixels and (b) the second pixels.

The one or more processors can be configured to: receive a second command to edit the first user-composed image; edit the first user-composed image; save the edited first user-composed image as a second user-composed image.

A processing system is disclosed. The processing system can include: means for storing, in response to a first command, a first image of a scene captured by a first camera, the first image comprising first pixels; means for storing, in response to the first command, a second image of the scene captured by a second camera, the second image comprising second pixels; means for storing, in response to the first command, a first user-composed image of the scene, the first user-composed image comprising first user-composed pixels derived from at least one of: (a) the first pixels and (b) the second pixels.

The processing system can further include: means for receiving a second command to edit the first user-composed image; means for editing the first user-composed image; means for saving the edited first user-composed image as a second user-composed image.

A non-transitory computer readable medium is disclosed. The medium can include program code, which, when executed by one or more processors, causes the one or more processors to perform operations. The program code can include code for: storing, in response to a first command, a first image of a scene captured by a first camera, the first image comprising first pixels; storing, in response to the first command, a second image of the scene captured by a second camera, the second image comprising second pixels; storing, in response to the first command, a first user-composed image of the scene, the first user-composed image comprising first user-composed pixels derived from at least one of: (a) the first pixels and (b) the second pixels.

The program code can include code for: receiving a second command to edit the first user-composed image; editing the first user-composed image; saving the edited first user-composed image as a second user-composed image.

BRIEF DESCRIPTION OF DRAWINGS

For clarity and ease of reading, some Figures omit views of certain features. Unless expressly stated otherwise, the drawings are not drawn to scale.

DETAILED DESCRIPTION

Part 1

Figure 1:
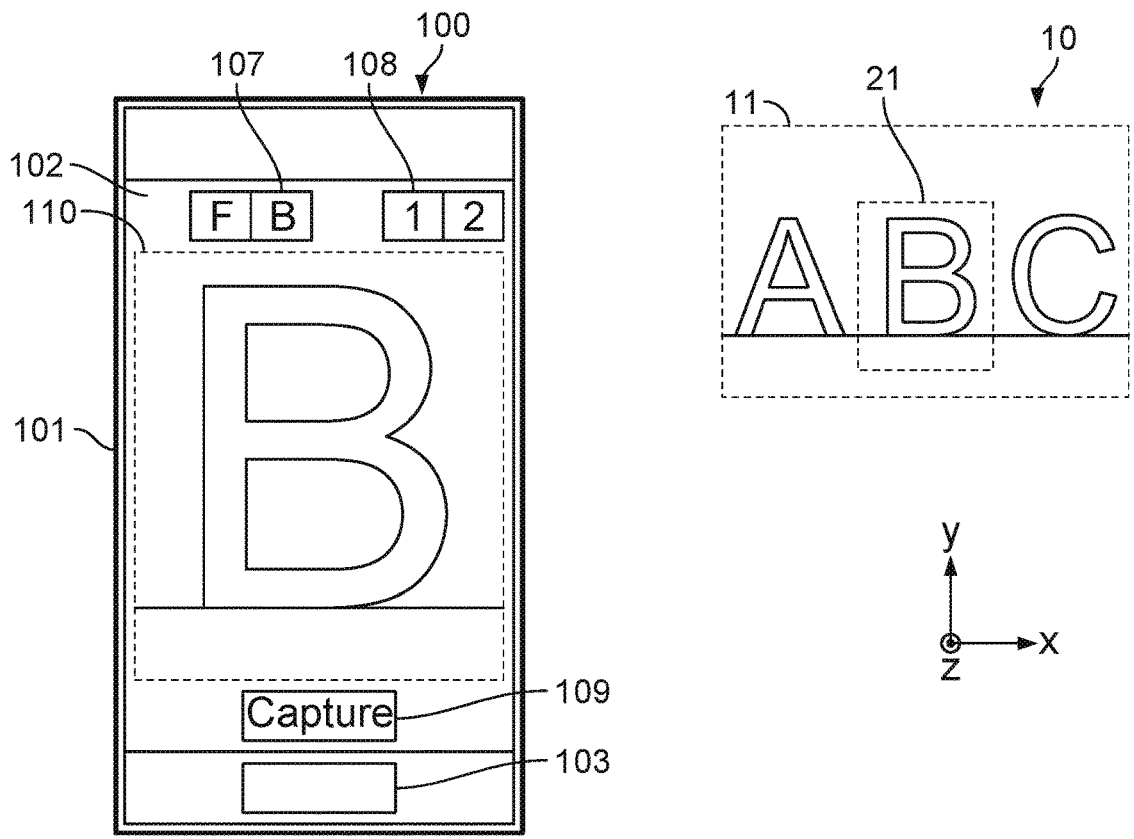
FIG. 1 is schematic front plan view of a mobile device and a schematic representation of a scene.

While the features, methods, devices, and systems described herein can be embodied in various forms, some exemplary and non-limiting embodiments are shown in the drawings, and are described below. The features described herein may be optional. Implementations can include more, different, or fewer features than the examples discussed.

The subject matter is described with illustrative examples. The claimed inventions are not limited to these examples. Changes and modifications can be made to the claimed inventions without departing from their spirit. It is intended that the claims embrace such changes and modifications.

Part 2

Figure 2:
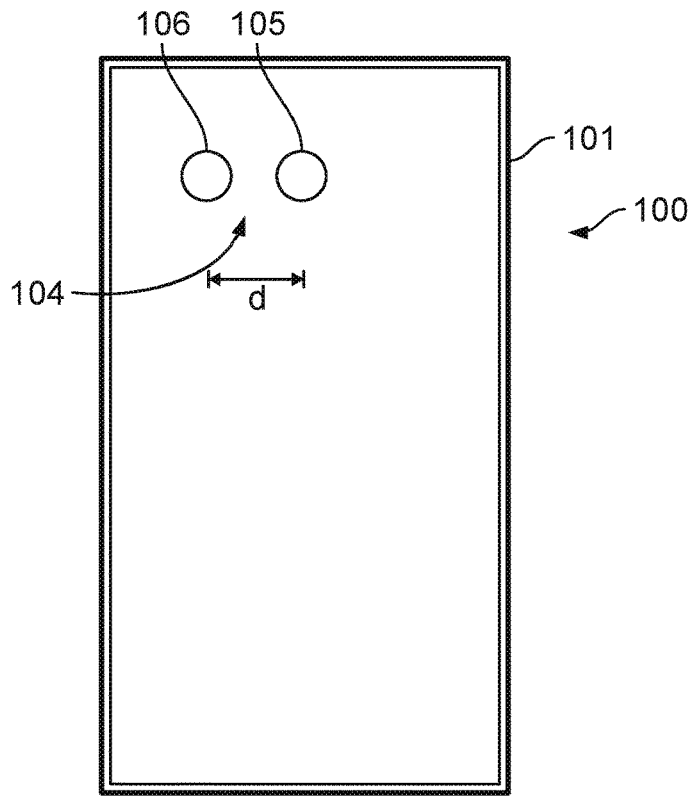
FIG. 2 is a schematic rear plan view of the mobile device.

FIGS. 1 and 2 show a front and a back, respectively, of mobile device 100, which can include a body or outer frame 101, a display 102, one or more physical buttons 103, and a camera group 104 including a first camera 105 and a second camera 106. Although FIG. 2 shows first camera 105 being directly lateral to second camera 106, this arrangement (as are all features disclosed in this application) is only exemplary. First camera 105 can have any position relative to second camera 106. First and second cameras 105, 106 can be disposed on separate mobile devices. First and second cameras 105, 106 can be located on any portion of mobile device 100 (e.g., front, back, sides).

Mobile device 100 can be configured to enter a viewfinder mode. While in viewfinder mode, mobile device 100 can present virtual buttons 107-109 and a viewfinder zone 110. Button 107 can control which camera group 104 is active (e.g., button "F" for a front-facing camera group 104 (not shown for clarity) and button "B" for a back-facing or rear-facing camera group 104 shown in FIG. 2).

Button 108, sometimes referred to herein as "camera button 108", can control whether viewfinder zone 110 shows images captured by first camera 105 (button "1") or second camera 106 (button "2"). Camera button 108 can thus control which camera 105, 106 of camera group 104 is active, which is further discussed below. Capture button 109 can cause mobile device 100 to capture one or more images of scene 10.

Although viewfinder zone 110 is shown as occupying a portion of display 102, viewfinder zone 110 can be coextensive with display 102. While in viewfinder mode, at least one camera of the selected camera group 104 can be continuously imaging (e.g., capturing) scene 10. These images can be presented in viewfinder zone 110 to provide a sample of the at least one camera's view. When the user presses capture button 109, mobile device 100 can cause camera group 104 to formally save one or more images of scene 10 in memory (e.g., non-volatile memory).

Figure 3:
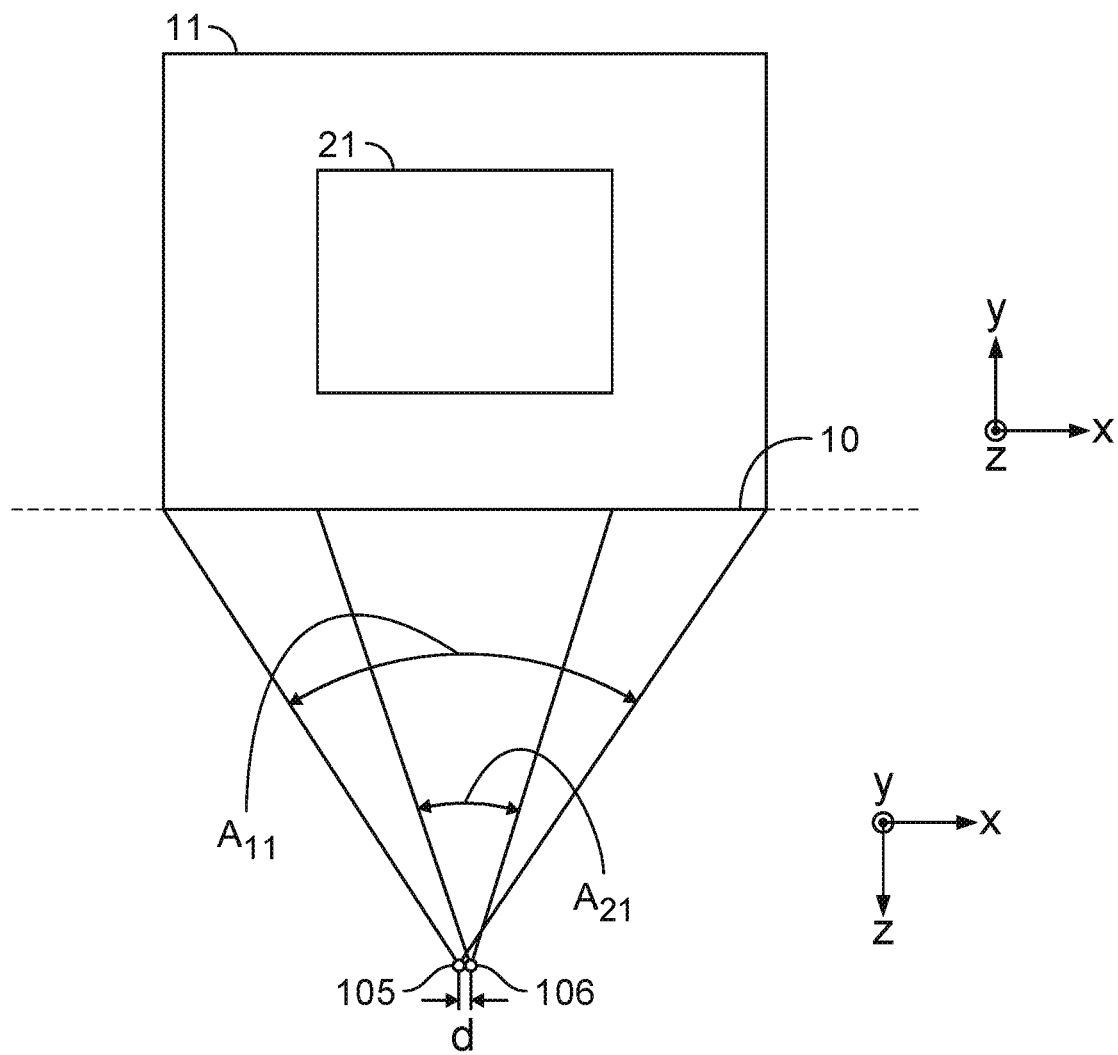
FIG. 3 includes a lower portion and an upper portion. The lower portion is a schematic top plan view of first and second cameras of the mobile device. The upper portion is a schematic front plan view of a first field of view of the first camera and a second field of view of the second camera.

Referring to FIGS. 1-3, first camera 105 can have a wider angle of view $A_{11}$, resulting in a wider field of view 11 and second camera 106 can have a narrower angle of view $A_{21}$, resulting in a narrower field of view 21. As a result, first camera 105 can have a smaller optical zoom while second camera 106 can have a larger optical zoom. Field of views 11, 21 can have any aspect ratios. The aspect ratios can be the same or different. FIG. 1 shows mobile device 100 presenting narrow field of view 21 of second camera 106 in viewfinder zone 110.

According to some examples, mobile device 10 can be configured such that wider field of view 11 fully encloses narrower field of view 21. First camera 105 can have a lower optical zoom than second camera 106. Although fields of view 11 and 21 have been described as being "wider" and "narrower", fields of view 11 and 21 can have a variety of different relationships, as discussed below. According to other examples, fields of view 11, 21 may be equally sized and distinct.

FIG. 1 illustrates how images of scene 10 captured by first camera 105 can differ from images of scene 10 captured by second camera 106. With its wider field of view 11, first camera 105 can simultaneously capture scene objects A, B, and C. Due to its lower optical zoom, first camera 105 may be unable to resolve some details of scene objects A, B, and C. For example, if scene object B was a tree, then first camera 105 may be unable to resolve contour of the tree's individual leaves.

With its narrower field of view 21, second camera 106 can capture less two dimensional area of scene 10 than first camera 105. In the example of FIG. 1, narrower field of view 21 includes scene object B, but does not include scene objects A or C. Due to its higher optical zoom, second camera 106 can resolve more details of captured two-dimensional area than first camera 105. For example, and if scene object B was the tree, second camera 106 may be capable of resolving the contour of the individual leaves.

According to some examples, first camera 105 is equipped with a wide-angle lens and second camera 106 is equipped with a telephoto lens. This arrangement, however, is purely exemplary. In other examples, both first camera 105 and second camera 106 are both equipped with telephoto lens, but the optical zoom of first camera 105 is set lower than the optical zoom of second camera 106. According to some examples, neither first camera 105 nor second camera 106 are equipped with a wide-angle or telephoto lens.

Because first and second cameras 105, 106 each have unique advantages and disadvantages, mobile device 100 can be configured to instruct both first camera 105 and second camera 106 to capture scene 10. For example, when a user presses capture button 109, mobile device 100 can cause first camera 105 to capture field of view 11 as first image 411 and second camera 106 to simultaneously capture field of view 21 as second image 421. As used herein "simultaneously" means "substantially simultaneously" and includes the case where first camera 105 captures field of view 11 slightly before/slightly after (e.g., 0.5 seconds or less before/after) second camera 106 captures field of view 21.

Part 3

Figure 4:
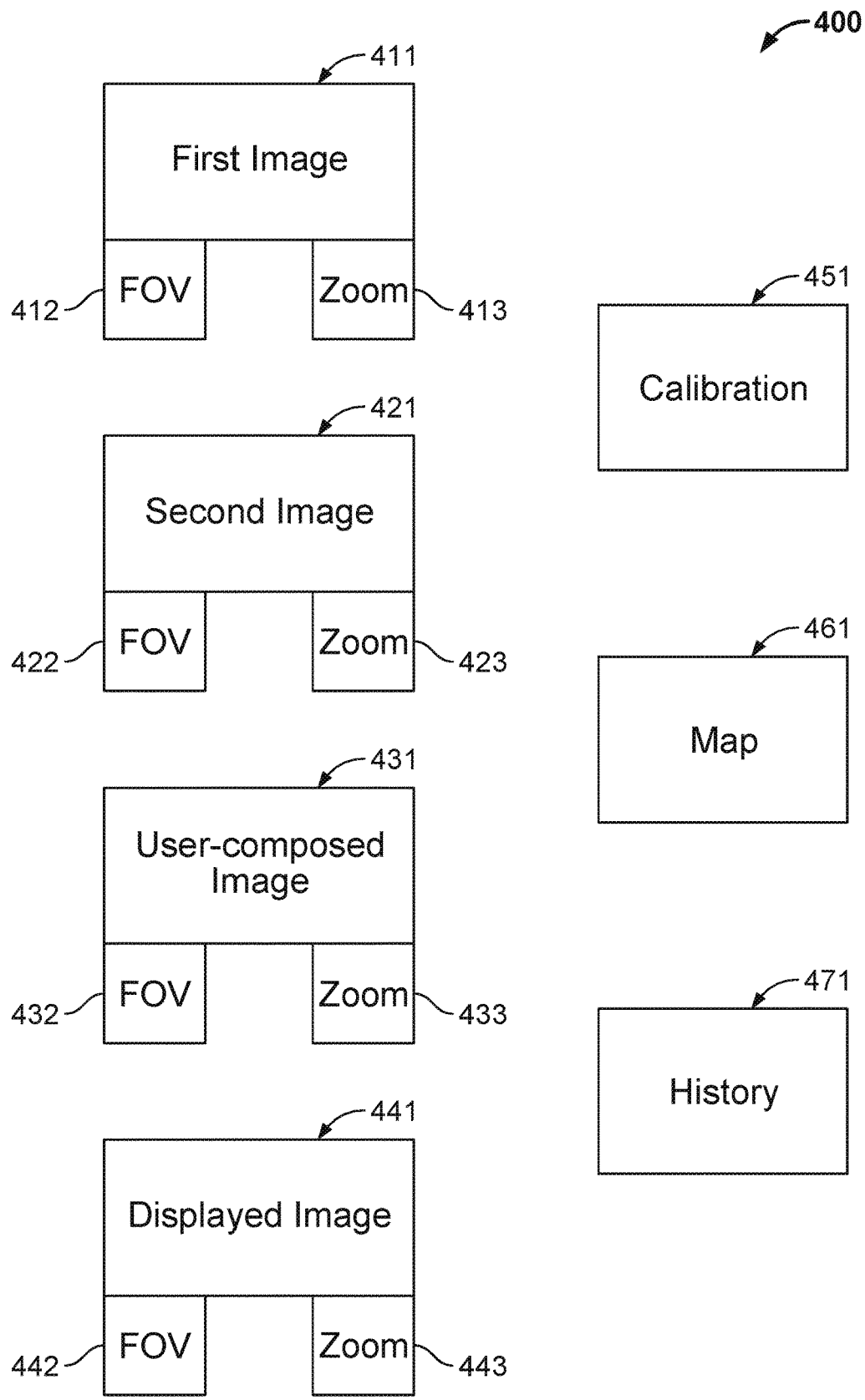
FIG. 4 is a block diagram of electronic files.

FIG. 4 is a block diagram of digital files 400 that mobile device 100 can prepare. Digital files 400 can include first image 411 captured by first camera 105, second image 421 captured by second camera 106, a user-composed image 431, a displayed image 441, calibration 451, map 461, and history 471.

First image 411 can be the full resolution image captured by first camera 105. First image 411 can have a first field of view 412 equal to field of view 11 and a first level of zoom 423 corresponding to the optical zoom of first camera 105. First image 411 can apply a first coordinate system.

Second image 421 can be the full resolution image captured by second camera 106. Second image 421 can have a second field of view 422 equal to field of view 21 and a second level of zoom 423 corresponding to the optical zoom of second camera 106. Second image 421 can apply a second coordinate system.

First field of view 412 may fully enclose second field of view 422. Alternatively, first field of view 412 may only overlap a portion of second field of view 422. First level of zoom 423 can be less than second level of zoom 423. According to some examples, first and second images 411, 421 have been pre-spatially and pre-photometrically aligned.

User-composed image 431 can be a sample of first image 411, a sample of second image 421, and a combination of samples of first image 411 and samples of second image 412. As used herein, the term "sample" conveys source. For example, if first image 411 is globally sampled 1:1, then user-composed image 431 can be equivalent to first image 411.

User-composed image 431 can be derived from first image 411, derived from second image 421, and derived from a both first and second images 411, 421.

Image pixels can be derived from samples. Derivation can account for adjustments to the samples. For example, if a million pixels are sampled from first image 411, then the million sampled pixels can be adjusted (e.g., photometrically aligned) and inserted into user-composed image 431. In this case, user-composed image 431 would include pixels derived from (e.g., derived from samples of) first image 411. In some examples, the number of derived pixels may be identical to the number of sampled pixels. Derivation can include no adjustment. Thus, derived pixels can be equal to sampled pixels. In some examples, the number of derived pixels may be less than the number of sampled pixels.

User-composed image 431 can have a user-composed field of view 432 and a user-composed level of zoom 433. User-composed field of view 432 can be equal to first field of view 412, second field of view 422, or any other user selected field of view. User-composed level of zoom 433 can be equal to first level of zoom 413, second level of zoom 423, or any other user selected level. User-composed image 433 can apply a global coordinate system G, discussed below.

User-composed image 431 can reflect any photoeffects selected by the user at the time of capture. Examples of photoeffects include color shifts, depth of field (e.g., Bokeh effects), and averaging effects. An averaging effect can, for example, average the color channel values of all, or a selected group of, pixels in two different images (e.g., first image 411 and second image 421). A depth of field (e.g., Bokeh) effect can rely on color channel values of pixels in first image 411 and pixels in second image 421.

Mobile device 100 can apply post-processing effects (e.g., recomposing) to user-composed image 431 instead of first image 411 and second image 421. Therefore, mobile device 100 can preserve the original source data present in first and second images 411, 421. Mobile device 100 can be configured to initially set user-composed image 431 equal to the image captured by the active camera plus any photoeffects selected by the user at the time of capture.

First and second images 411, 412 can respectively have native first and second coordinates systems, discussed below. Global coordinate system G can be applied to compare first image 411, first field of view 412, and first level of zoom 413 with second image 421, second field of view 422, and second level of zoom 423. FIGS. 2 and 3 show that vector d separates first camera 105 from second camera 106. As such, transformation from the first coordinate system to global coordinate system G can be non-linear and transformation from the second coordinate system to global coordinate system G can be non-linear.

According to some examples, global coordinate system G is a rectified coordinate system. When the present application refers to accessing features of first image 411 and second image 421, such accessing can be performed through global coordinate system G, the first coordinate system, or the second coordinate system.

For example, if mobile device 100 accesses first field of view 412, mobile device 100 can access first field of view 412 through the first coordinate system or global coordinate system G. If mobile device 100 accesses second level of zoom 423, such access can be through the first coordinate system or global coordinate system G. If mobile device 100 derives pixels from first image 411, such pixels can be derived through global coordinate system G.

Global coordinate system G can be equivalent to the first coordinate system or the second coordinate system. Alternatively, global coordinate system G can transform (linearly or non-linearly) to first coordinate system and transform (linearly or non-linearly) to second coordinate system.

Displayed image 441 can be the view presented on mobile device display 102. Displayed image 441 can rely on pixels derived from a source (e.g., first image 411, second image 421, user-composed image 431). Displayed image 441 can have a displayed field of view 442 and a displayed level of zoom 443. Displayed image 441 can apply global coordinate system G.

Because displayed image 441 can have a predetermined resolution equal to studio zone 601 (discussed below), displayed level of zoom 443 can be a function of displayed field of view 442 and the predetermined resolution.

Map 461 can enable mobile device 100 to transform features of first image 411 and features of second image 421 to global coordinate system G. Mobile device 100 can generate map 461 with first image 411, second image 421, and calibration 451.

Part 4

Figure 5:
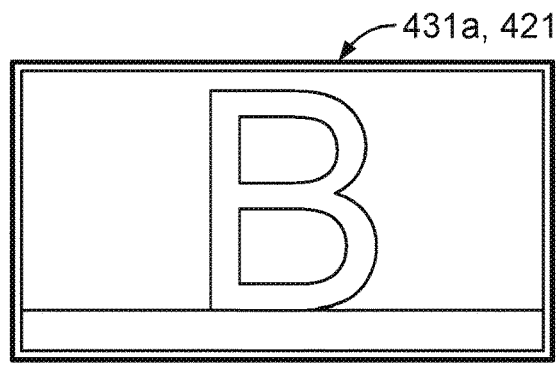
FIGS. 5-8 are views of user-composed images.

FIGS. 5-8 depict an example recomposition of user-composed image 431. Recomposed user-composed images 431 are also referred to as recomposed images 431. As shown in FIG. 5, first user-composed image 431a is equal to second image 421 with user-composed field of view 432 equal to second field of view 422 and user-composed level of zoom 433 equal to second level of zoom 423.

Figure 6:
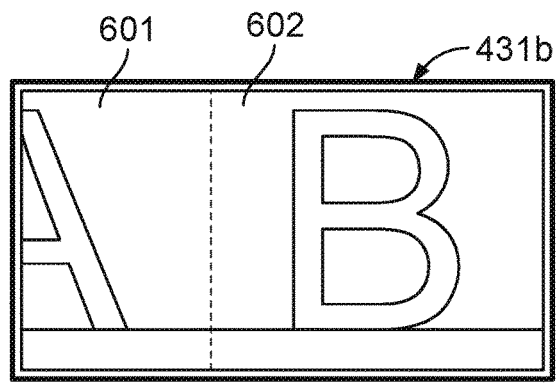

FIG. 6 shows second user-composed image 431b (i.e., a first recomposed image). Area 601 overlaps first field of view 412, but not second field of view 422. Thus, mobile device 100 populates area 601 with pixels derived from first image 411. If user-composed level of zoom 433 exceeds first level of zoom 413, then first image 411 may be incapable of supplying enough pixels to populate area 601. In such a case, mobile device 100 can interpolate to fill in the remaining pixels. The interpolation can rely on pixels derived from first image 411 and pixels derived from second image 421.

Area 602 intersects (i.e., overlaps) both first and second fields of view 412, 422. Thus, mobile device 100 can populate area 602 with pixels derived from first image 411 or second image 421 depending on user-composed level of zoom 433. To enable area 602 to have the same field of view and level of zoom as first user-composed image 431a, mobile device 100 can enable dynamic adjustment of the aspect ratio of user-composed image 433.

Figure 7:
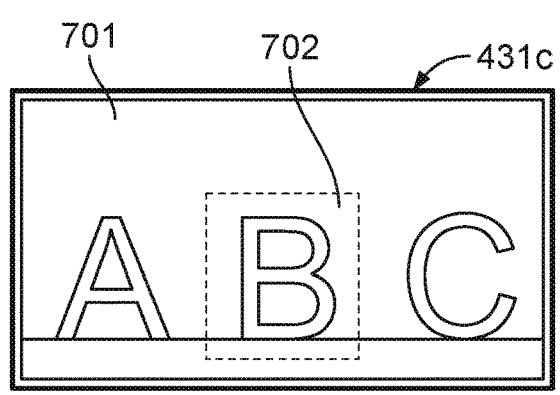

FIG. 7 shows third user-composed image 431c (i.e., a twice recomposed image). User-composed level of zoom 433 exceeds first level of zoom 413 while user-composed field of view 432 is equal to first field of view 412. Therefore, third user-composed image 431c has a greater resolution than first image 411.

Area 701 overlaps first field of view 412, but not second field of view 422. Thus, mobile device 100 samples pixels for area 701 from first image 411. As stated above, the term sampling, as used herein, can include 1:1 sampling. Thus, mobile device 100 can populate area 701 with all pixels derived from a patch of first image 411.

Area 702 overlaps first and second fields of view 412, 422. Mobile device 100 can supply pixels to area 702 by sampling first image 411 or second image 421. Mobile device 100 can select between sampling first image 411 or second image 421 by comparing user-composed level of zoom 433 with first level of zoom 413 and second level of zoom 423. To fill in any unpopulated pixels of area 701, mobile device 100 can interpolate the pixels derived from first image 411 and second image 421.

Figure 8:
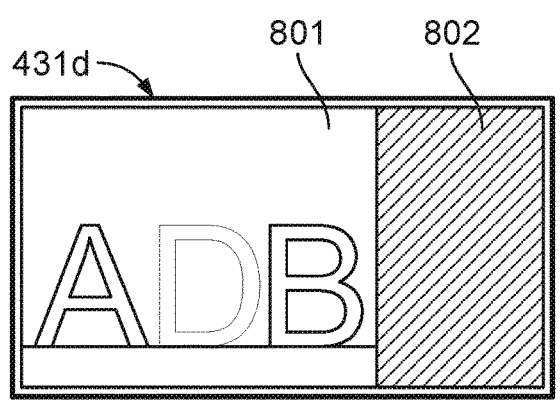

Referring to FIG. 8, fourth user-composed image 431d includes area 801, but does not include area 802. User-composed level of zoom 433 is equal to first level of zoom 413. Thus, mobile device 100 can populate area 801 with pixels (e.g., 1:1 derived pixels) from a patch of first image 411. User-composed field of view 432 is different than first field of view 412, thus resulting in an adjusted aspect ratio.

FIG. 8 further shows scene object D (omitted from the other views), which has been blurred via a depth of field (e.g., Bokeh) photoeffect effect.

Because the original data of first and second images 411, 421 can be preserved during recomposition, mobile device 100 enables recomposition in any order between first through fourth user-composed images 431a-431d. For example, the user could begin at fourth user-composed image 431d, recompose to second user-composed image 431b, recompose to first user-composed image 431a, then end with third user-composed image 431c.

To recompose user-composed image 431, mobile device 100 can begin by accessing user-composed image 431 and presenting a displayed image 441 based on the accessed user-composed image 431. Displayed image 441 can be derived (e.g., sampled) from user-composed image 431.

The user can manipulate displayed image 441 (e.g., panning, zooming, applying photoeffects). As the user manipulates displayed image 441, mobile device 100 can re-render displayed image 441 based on first image 411 and second image 421. After the user is finished manipulating displayed image 441, mobile device 100 can recompose user-composed image 431 based on a net effect of the manipulations. Mobile device 100 can set user-composed image 431 as being equal to the recomposed image. Mobile device 100, however, can preserve the original user-composed image (e.g., as metadata or as a traditional image file (e.g., JPEG))

Thus, when the user re-accesses user-composed image 431, mobile device 100 can default to presenting a displayed image 441 derived from the recomposed user-composed image, and not the original user-composed image. However, mobile device 100 can enable the user to revert to the original user-composed image.

As a result, examples of mobile device 100 enable dynamic recomposition of user-composed image 431 without requiring the user to formally access or view first image 411 or second image 421. This is because any data that mobile device 100 needs to extract first image 411 and/or second image 421 can be automatically accessed and derived behind-the-scenes.

Furthermore, examples of mobile device 100 enable the user to recompose with user-composed image 431 as a starting point. As a first example, and referring to FIG. 6, imagine that the user intended for user-composed image 431 to include all of scene object A, but made an error resulting in second user-composed image 431b. Instead of starting from scratch (e.g., starting at first user-composed image 431a), the user can open second user-composed image 431b and begin recomposing from the initial conditions of second user-composed image 431b.

As a second example, and referring to FIG. 8, imagine that the user intended for user-composed image 431 to lack any photoeffect, but made an error resulting in fourth user-composed image 431d. Instead of starting from scratch (e.g., starting at first user-composed image 431a, recomposing the field of view to match fourth user-composed image 431d, and recomposing the level of zoom to match fourth user-composed image 431d), the user can begin at fourth user-composed image 431d, and instruct mobile device 100 to remove the depth-of-field effect.

In response, mobile device 100 can retain the field of view and level of zoom of fourth user-composed image 431d, derive pixels from first and/or second images 411, 421 based on the retained field of view and level of zoom, and populate the recomposed image with the derived pixels.

Part 5

Figure 9:
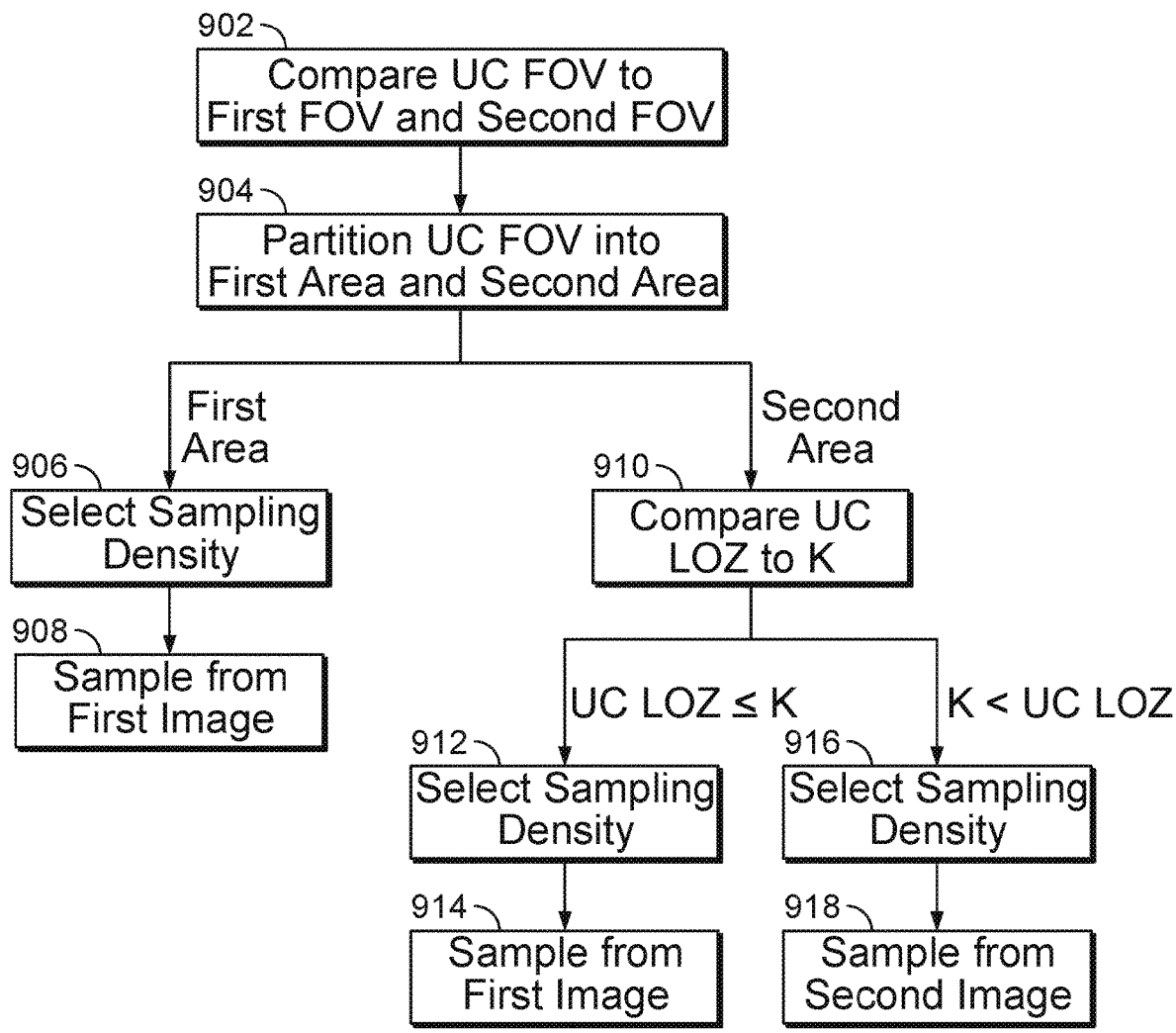
FIG. 9 is a block diagram of an example method.

According to some examples, mobile device 100 chooses the source of pixels for a user-composed image according to the series of sourcing operations (also called the compositing method or the sourcing method) shown in FIG. 9.

At block 902, mobile device 100 can compare a user-composed field of view 432 to first field of view 412 and second field of view 422. At block 904, mobile device 100 can partition user-composed field of view 432 into first and second areas. The first area (e.g., area 701 of FIG. 7) overlaps first field of view 412, but not second field of view 422. The second area overlaps first field of view 412 and second field of view 422 (e.g., area 702 of FIG. 7).

At block 906, mobile device 100 can select a sampling density for sampling a patch of first field of view 412 corresponding to the first area. Mobile device 100 can select the sampling density by comparing first level of zoom 413 to user-composed level of zoom 433.

If first level of zoom 413≤user-composed level of zoom 433, then mobile device 100 can set the sampling density at 1:1 such that every pixel in the patch of first image 411 is sampled. Otherwise, and according to some examples, mobile device 100 only samples some of the pixels in the patch of first image 411. Sampling at less than a 1:1 ratio is called downsampling or downscaling. At block 908, mobile device 100 samples first image 411 and populates the first area with pixels derived from the samples.

At block 910, mobile device 100 can compare user-selected level of zoom 433 to a predetermined and user selectable value K, where first level of zoom 413≤K≤second level of zoom 423. If user-selected level of zoom 433≤K, then mobile device 100 can select a sampling density for a patch of first field of view 412 corresponding to the second area at block 912. If user-selected level of zoom 433>K, then mobile device 100 can select a sampling density for a patch of second field of view 422 corresponding to the second area at block 916.

At block 912, mobile device 100 can select the sampling density by comparing first level of zoom 413 to user-composed level of zoom 433. If first level of zoom 413≤user-composed level of zoom 433, then mobile device 100 can set the sampling density at 1:1 such that every pixel in the patch of first image 411 is sampled. Otherwise, mobile device 100 can only sample some of the pixels in the patch of first image 411. At block 914, mobile device 100 can sample first image 411 and populate the second area with pixels derived from the samples.

At block 916, mobile device 100 can select the sampling density by comparing second level of zoom 423 to user-composed level of zoom 433. If first level of zoom 423≤user-composed level of zoom 433, then mobile device 100 can set the sampling density at 1:1 such that every pixel in the patch of second image 421 is sampled. Otherwise, mobile device 100 can only sample some of the pixels in the patch of first image 421. At block 914, mobile device 100 can sample second image 421 and populate the second area with the samples.

If user-composed image 431 lacks pixels after blocks 908, 914, and 918 (executed as appropriate) are concluded, then values for the missing pixels can be interpolated from the populated pixels.

Part 6

Figure 10:
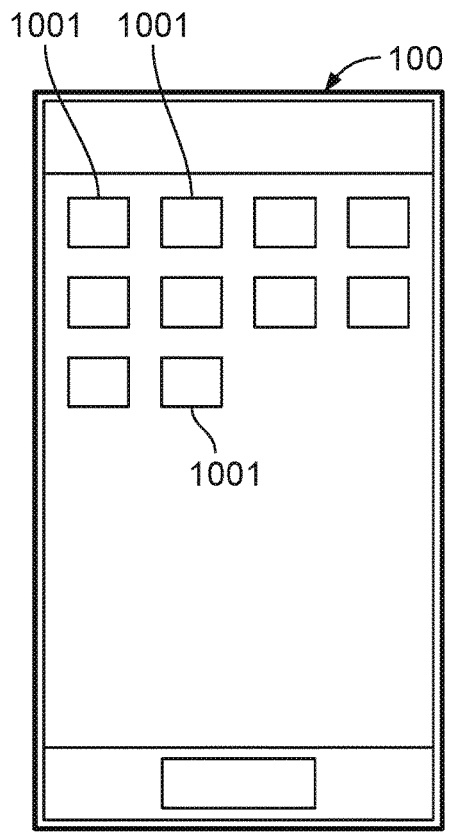
FIG. 10 is a schematic front plan view of the mobile device presenting thumbnails.
Figure 10A:
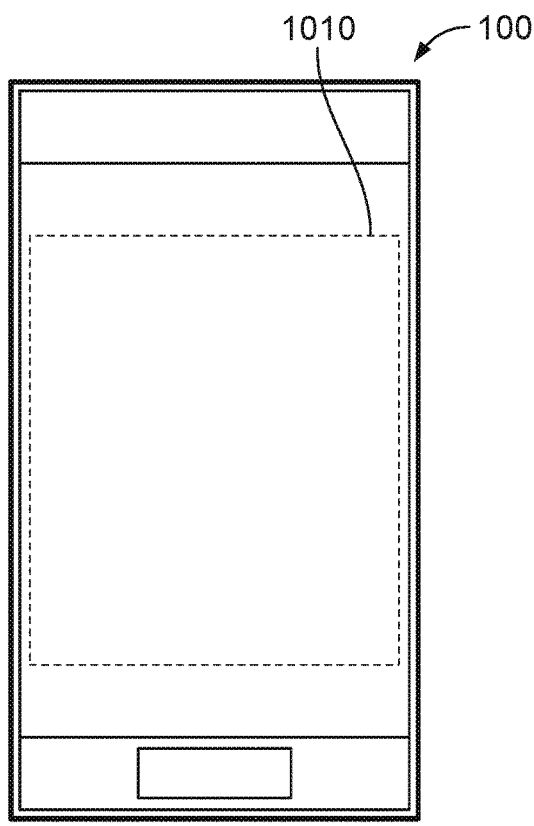
FIG. 10A is a schematic front plan view of the mobile device and indicates a studio zone in dash lines.

Mobile device 100 can offer a gallery mode. Upon opening gallery mode, and as shown in FIG. 10, mobile device 100 can present the user with a plurality of image thumbnails 1001. Each thumbnail 1001 can be a preview (e.g., sample) of a different user-composed image 431.

When the user selects (e.g., taps) a thumbnail 1001, mobile device 100 can access the image associated with the thumbnail and enter a studio mode. During studio mode, the accessed image, or a downsample thereof, can be presented in a studio zone 1010 (which can be coextensive with viewfinder zone 110).

Studio mode can include a plurality of user-selectable sub-modes, including: (a) a recomposing viewer mode, (b) a non-recomposing viewer mode (also called an anchor mode), (c) a user-composed field of view recomposition mode, (d) a user-composed zoom recomposition mode, and (e) a photoeffect recomposition mode. Mobile device 100 can enable the user to dynamically switch between modes via one or more virtual buttons.

Recomposing can adjust user-composed image 431 (as discussed above) and/or displayed image 441. Recomposing can be the result of a user-interaction (e.g., zoom-in, zoom-out, pan, apply photoeffect). Recomposing can include compositing.

During recomposing, and as discussed above with reference to FIG. 9, pixels derived from first image 411 can be composited with pixels derived from second image 421. If mobile device 100 is touch-enabled, then recomposition can be touch-responsive (e.g., pinch to outwardly zoom, separate two fingers to inwardly zoom, swipe a single finger to pan). If mobile device 100 is non-touch enabled, then recomposition can be conducted with a suitable input device (e.g., mouse, keyboard).

Initially, user-composed image 431 can be equal to the image captured by the active camera. As discussed above, a user can apply camera button 108 to designate either first camera 105 or second camera 106 as "active" and the preview in viewfinder zone 110 can be sourced by the active camera. Thus, and according to this example, if the user pressed capture button 109 while second camera 106 was designated as active, then user-composed image 431 would be initially set equal to second image 421.

Upon entering studio mode, mobile device 100 can automatically present displayed image 441 with a displayed field of view 442 equal to user composed field of view 432. Mobile device 100 can automatically resize studio zone 1010 to accommodate the aspect ratio of displayed field of view 442.

Part 6A

Displayed image 441 can begin with a displayed field of view 442 equal to the user composed field of view 443. During recomposing viewer mode, pixels of displayed image 441 can be sampled directly from first image 411 and second image 421, without reference to user-composed image 431. According to some examples, no changes to first image 411, second image 421, or user-composed image 431 can occur during recomposing viewer mode.

As the user pans or zooms, recomposing viewer mode can apply the above-discussed pixel sourcing of FIG. 9 (including interpolation, if needed), except displayed level of zoom 443 is applied instead of user-composed level of zoom 433.

Part 6B

Anchor mode enables user-interaction (e.g., panning, zooming) with a particular image without automatic recomposing. During anchor mode, the user can select user-composed image 431, first image 411, or second image 421. Anchor mode can default to user-composed image 431.

According to some examples, anchor mode causes mobile device 100 to supply displayed image 441 with pixels sampled from only a single image (e.g., either first image 411, second image 421, or user-composed image 431).

According to some examples, no changes to first image 411, second image 421, or user-composed image 431 occur during anchor mode.

While in anchor mode, mobile device 100 can compare displayed level of zoom 443 to the source image level of zoom. The comparison can determine whether the sampling involves downsampling or 1:1 sampling. Mobile device 100 can interpolate sampled pixels if displayed level of zoom 443 exceeds the source image level of zoom.

Part 6C

According to some examples, field of view recomposition (FOVR) mode enables user adjustment of user-composed field of view 432 without affecting user-composed level of zoom 433. While in FOVR mode, displayed image 441 can be sourced and presented according to the techniques discussed for the recomposing viewer mode.

While in FOVR mode, the user can click a virtual button that automatically sets user-composed field of view 432 equal to displayed field of view 442. Alternatively, the user can draw a geometric shape (e.g., rectangle) around a desired portion of the image. After doing so, mobile device 100 can set user-composed field of view 432 equal to the portion of displayed field of view 442 disposed in the geometric shape. Mobile device 100 can limit the geometric shape to rectangles (e.g., squares).

Part 6D

According to some examples, level of zoom recomposition (LOZR) mode enables user adjustment of user-composed level of zoom 433 without affecting user-composed field of view 432. While in LOZR mode, displayed image 441 can be sourced and presented according to the techniques discussed for recomposing viewer mode. Mobile device 100 can be configured to prevent the user from panning outside the present user-composed field of view 432 during LOZR mode.

To set user-composed level of zoom 433, the user can click a virtual button that automatically sets user-composed level of zoom 433 equal to displayed level of zoom 443. Alternatively, the user can enter a value. If the user chooses to enter a value, mobile device 100 can present an input window listing both first and second levels of zoom 413, 423 along with the current user-composed level of zoom 433.

Part 6E

While recomposing, the user can apply one or more photoeffects to user-composed image 431. One example of a photoeffect is a depth of field (e.g., Bokeh) effect. To simulate a depth of field effect, mobile device 100 can apply first and second images 411, 421 to construct a stereoscopic depth map. Another example is a color shift effect (e.g., increasing red values of every pixel by 10%). Another example is an averaging effect, which averages color channels of pixels across two images.

After the user selects an item present in user-composed image 431 (e.g., B), mobile device 100 can estimate a depth of field range of the selected item, and blur items falling outside of the estimated depth of field range.

When the user selects an item that falls outside second field of view 422 (e.g., C), mobile device 100 can apply a one-dimensional and non-stereoscopic technique to build a depth map and to estimate a depth range. As a result, mobile device 100 can apply a first depth of field technique for items captured in both first and second images 411, 421, and can apply a second depth of field technique for items captured in only first image 411.

Photoeffect recomposition mode enables the user to remove a previously applied photoeffect. For example, and referring to FIG. 8, the user may wish to remove the applied depth of field (e.g., Bokeh) effect, which resulted in the distorting of scene object D. To do so, mobile device 100 can re-generate user-composed image 431.

More specifically, mobile device 100 can access user-composed field of view 432 and user-composed level of zoom 433, then re-generate user-composed image 431 with pixels derived from first image 411 and second image 412. The regeneration can rely on the sourcing operations (including interpolation) discussed with reference to FIG. 9.

According to this example, first and second images 411, 412 lack photoeffects. Therefore, the re-generated user-composed image 431 will not include the undesired depth of field effect, but will maintain the desired user-composed field of view 432 and level of zoom 433. After removing undesired photoeffects from user-composed image 431, the user can apply new and different photoeffects.

After the user has applied a photoeffect to user-composed image 431, the other modes can continue to apply the photoeffect. For example, during the recompositing viewer mode can maintain the photoeffect when presenting various displayed images 441. Techniques for maintaining one or more applied photoeffects are further discussed below.

Part 7

Figure 11:
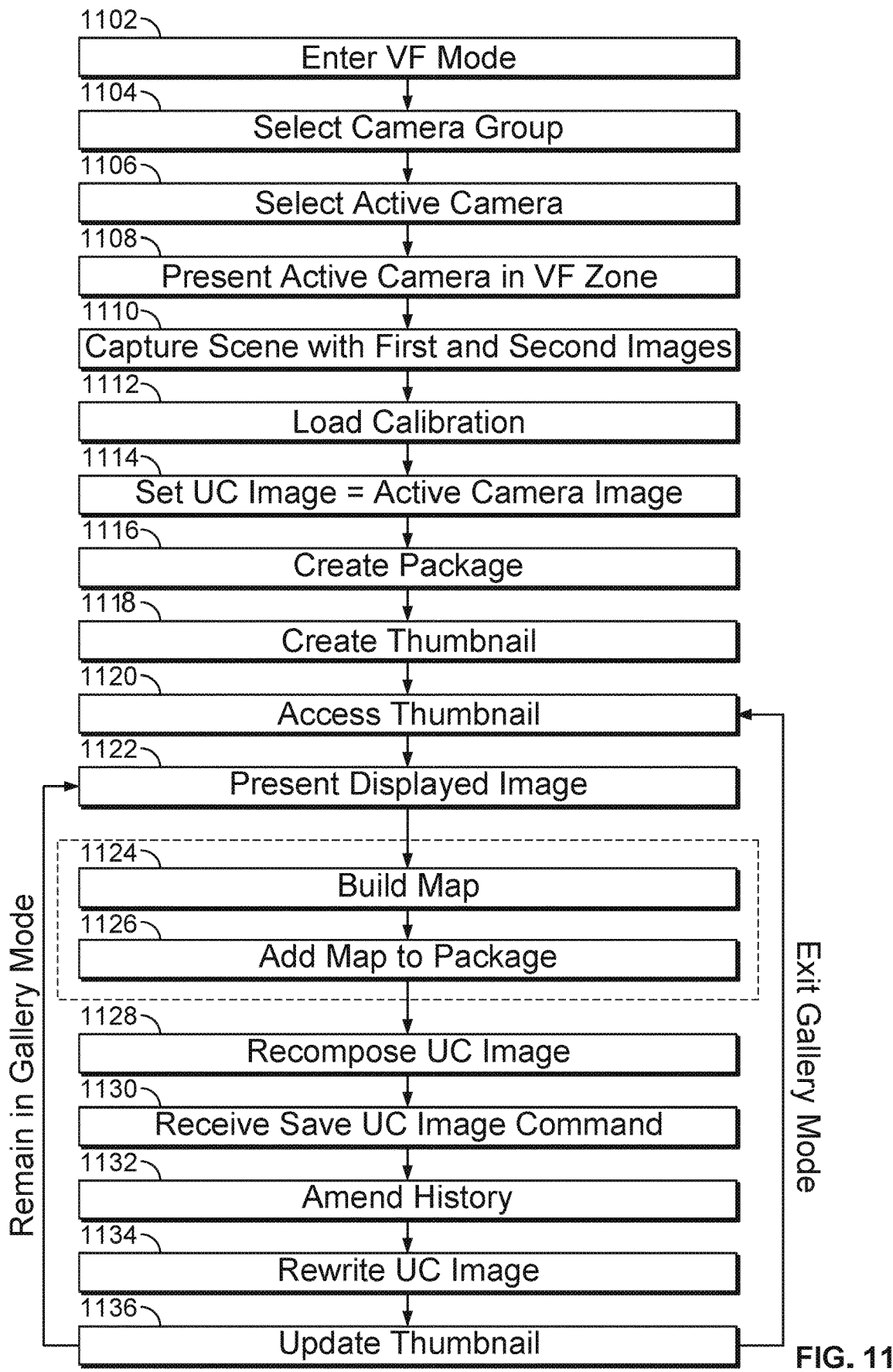
FIG. 11 is a block diagram of an example method.

FIG. 11 shows an example method of building and recomposing user-composed image 431. The method includes a series of operations. Mobile device 100 can be configured to perform some or all of these operations.

At block 1102 mobile device 100 enters viewfinder mode. At block 1104, the user selects a camera group 104. At block 1106, the user selects an active camera from the selected camera group 104. At block 1108, mobile device 100 presents a view from the active camera in viewfinder zone 110. To do so, mobile device 100 can capture images with the active camera (but not the inactive camera) and present them in viewfinder zone 110. After presentation, mobile device 100 can discard these captured images.

At block 1110, the user can press capture button 109. In response, mobile device 100 can simultaneously (e.g., substantially simultaneously as discussed above) capture scene 10 with both first and second cameras 105, 106 (i.e., the active camera and the inactive camera). At block 1112, mobile device 100 can load calibration 451. At block 1114, mobile device 100 can set the user-composed image 431 as being equal to the image taken by the active camera.

At block 1116, mobile device 100 can combine first image 411, second image 421, user-composed image 431, calibration 451, and history 471 (further discussed below) into a package. The package can be a single discrete file. The package can be a zip file, a JPEG container with a media picture object extension, and the like. Calibration 451, map 461, and history 471 can be included in the package as, for example, JPEG app-headers or image-metadata. History 471 can include a first entry noting the identity of user-composed image 431 (e.g., entry one: user composed image 431=first image 411).

At block 1118, mobile device 100 can add a thumbnail 1001 to the image gallery. Thumbnail 1001 can be a preview (e.g., sample, crop, deriviation) of user-composed image 431. At block 1120, the user can click on (e.g., tap) thumbnail 1001. At block 1122, mobile device 100 can present displayed image 441 with a displayed field of view 442 equal to the user-composed field of view 432. Block 1122 can default to the non-recomposing viewer mode. Block 1122 can include the operations of FIG. 15, as further discussed below.

At block 1124, mobile device 100 can determine whether the package includes or lacks map 461. If the package lacks map 461, then mobile device 100 can perform blocks 1124 and 1126. If the package includes map 461, then mobile device 100 can skip to block 1128.

At block 1124, which can occur in parallel with block 1122, mobile device 100 can generate map 461 based on first image 411, second image 421, and calibration 451. Map 461, which is further discussed below, can include one or more maps (e.g., transforms) relating the pixels in first image 411 and the pixels in second image 421 to a global coordinate system. Map 461 can be used for spatial alignment and/or photometric (e.g., color, intensity) alignment. At block 1126, mobile device 100 can add map 461 to the package. The package can be a zip file, a JPEG container with a media picture object extension, and the like.

At block 1128, the user can recompose user-composed image 431 and/or displayed image 441 using any of the techniques discussed in the present application, including the sourcing operations (including interpolation) of FIG. 9. Thus, at block 1128, the user can switch from the non-recomposing viewer mode to any of the other modes (e.g., recomposing viewer mode, field of view recomposition mode, level of zoom recomposition mode, photoeffect recomposition mode).

At block 1130, the user can instruct mobile device (e.g., via a virtual button) to save a recomposed user-composed image 431. At block 1132, mobile device 100 can add an entry to history 471 (discussed below).

At block 1134, mobile device 100 can rewrite user-composed image 431 in the package to reflect the recomposed user-composed image 431. At block 1136, mobile device 100 can update the thumbnail to reflect the recomposed user-composed image 431 (e.g., sample the recomposed user-composed image 431).

After block 1136, and if the user exits gallery mode, mobile device 100 can begin at block 1120. If the user remains in gallery mode, mobile device 100 can begin at block 1122. According to some examples, thumbnail 1001 is not updated until the user exits gallery mode.

Part 8

Calibration 451 can include some or all of: (a) vector d between first camera 105 and second camera 106 (see FIG. 3), (b) an autofocus position of first camera 105 (if first camera 105 is capable of automatic focus), (c) an autofocus position of second camera 106 (if second camera 106 is capable of automatic focus), and any other data relevant to aligning first image 411 with second image 421.

Techniques for aligning images with intersecting fields of view are known in the art. U.S. Publication No. 2017/0024846 to Nash et al. discloses, among other things, examples of such techniques. According to some examples, pixels having key items (e.g., edges, brightness, color) in the non-transformed first image 411 are matched with pixels having corresponding key items in the non-transformed second images 421.

After these pixels have been matched, mobile device 100 can interpolate (i.e., estimate) to determine how pixels with non-key items should match. Key items and corresponding key items can be identified with a range of known techniques including a sum of square difference technique, a Laplacian of Gaussian technique, a Hessian determinant technique, and the like.

According to some examples, same channel and cross channel horizontal and vertical color gradients are calculated for each pixel in non-transformed first image 411 and non-transformed second image 412. A weighted average of (a) same channel and cross channel horizontal color gradients and (b) same channel and cross channel vertical color gradients is computed for each pixel.

The weighted average of each pixel represents an edge direction for each pixel. Pixels in non-transformed second image 412 are grouped into small clusters and an average edge direction for each small cluster is determined. The average edge direction for each small cluster of second image 412 is then compared with the edge direction for each pixel in a selected central area of first image 411. According to one example of a sum of square difference technique, the clusters and the selected central area of non-transformed first image 411 are iterated until the sum of square difference falls below a predetermined threshold value.

With this technique (or another technique) mobile device 100 can determine which pixels in non-transformed first image 411 intersect second field of view 422. Each of these intersecting (also called overlapping) pixels can then be mapped to a cluster of one or more pixels in second image 421. After doing so, mobile device 100 can prepare one or more global coordinate systems G along with one or more transform functions G(x) and $G^{-1}(x)$ that convert between global coordinate system G and first and second images 411, 421. According to some examples, global coordinate system G is set as a coordinate system of first image 411 (i.e., the first coordinate system).

Map 461 can include one or more transforms that spatially aligns the first coordinate system, the second coordinate system, and/or global coordinate system G via one or more translations, scalings, rotations and/or deformations. Map 461 can further include one or more transforms that photometrically align non-transformed first image 411 with respect to second image 421 and/or global coordinate system G (e.g., by equalizing color, intensity, and contrast).

Figure 12:
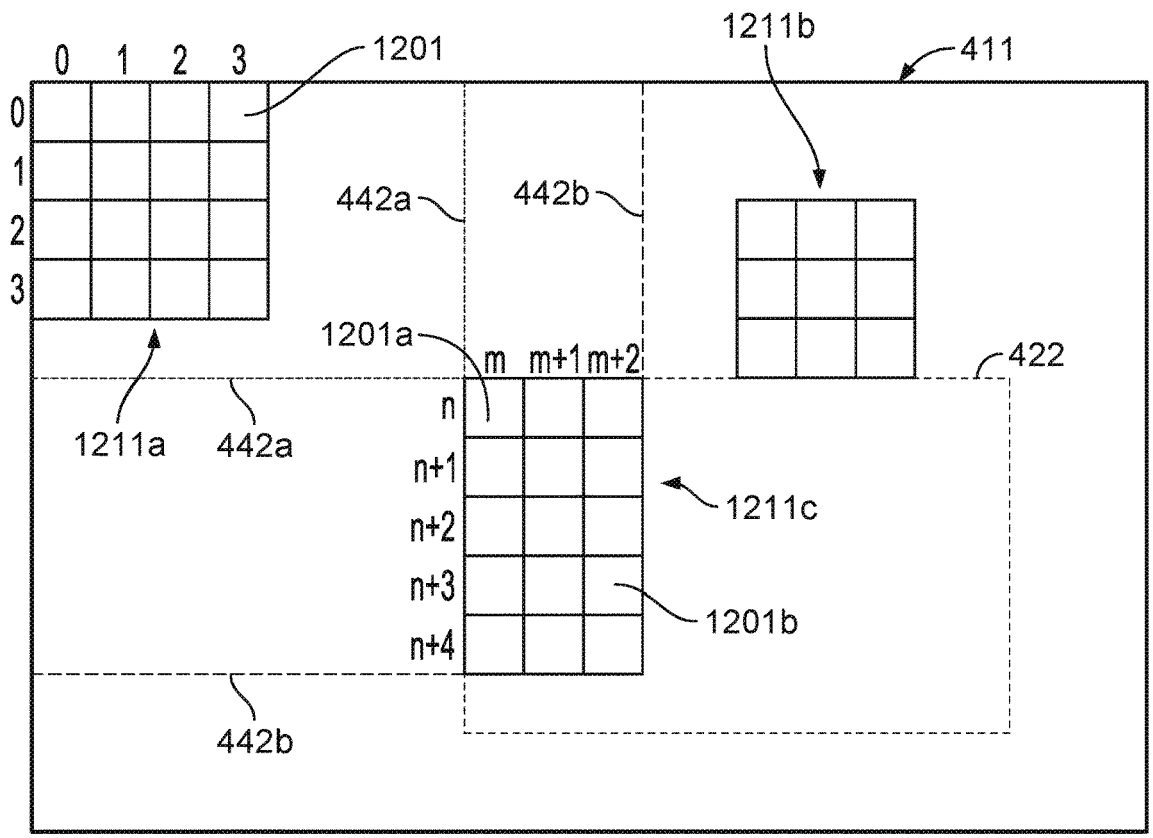
FIG. 12 is a schematic view of a first image from the perspective of a first coordinate system.
Figure 13:
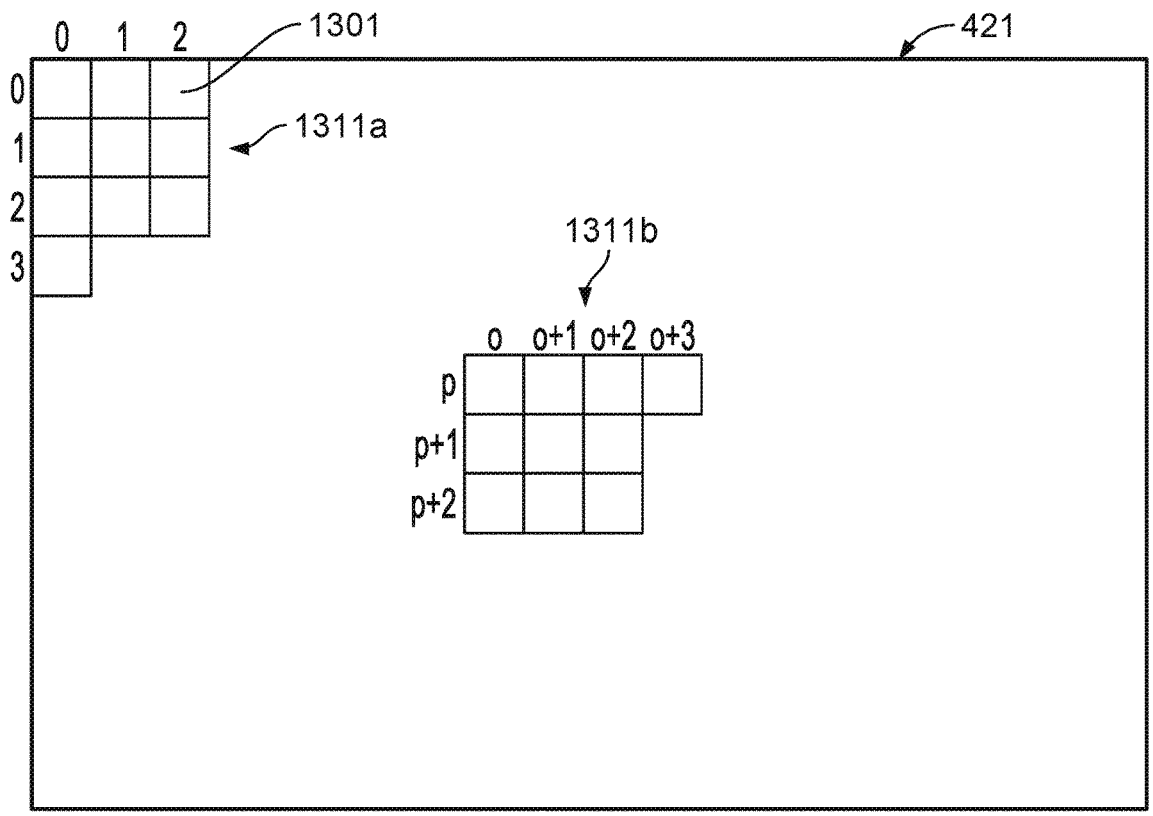
FIG. 13 is a schematic view of a second image from the perspective of a second coordinate system.

FIG. 12 applies a first coordinate system and FIG. 13 applies a second coordinate system. Thus, features (e.g., field of view, level of zoom) discussed with reference to FIGS. 12 and 13 can be non-transformed (i.e., not expressed from the perspective of global coordinate system G).

FIG. 12 shows first image 411 as a matrix of first pixels 1201. Each first pixel 1201 can have a three dimensional color vector (e.g., a red value, a green value, and a blue value). For clarity, only some first pixels 1201 are illustrated, specifically those in first image pixel clusters 1211a, 1211b, and 1211c. First pixels 1201 in first image pixel clusters 1211a and 1211b fall outside of second field of view 422 and therefore do not intersect second pixels 1301 in second image 421. First pixels 1201 in first image pixel cluster 1211c fall inside third field of view 422 and therefore do intersect second pixels 1301 in second image 421.

FIG. 13 shows second image 421 as a matrix of second pixels 1301. Each second pixel 1301 can have a three dimensional color vector, as described above. For clarity, only some second pixels 1301 are illustrated, specifically those in second image pixel clusters 1311a, 1311b.

As previously discussed, map 461 can relate clusters of one or more second pixels 1301 to each intersecting first pixel 1201 (e.g., each first pixel 1201 disposed inside second field of view 422). According to this example, second pixel cluster 1311a maps to first pixel 1201a and second pixel cluster 1311b maps to first pixel 1201b. Map 461 thus indicates that the field of view of first pixel 1201a is coextensive with second pixel cluster 1311a.

Because second level of zoom 423 exceeds first level of zoom 413, a field of view maps to more second pixels 1301 than first pixels 1201. As shown in FIG. 13, second pixel clusters 1311a, 1311b can be non-rectangular. In practice, second pixels clusters 1311*a*, 1311*b* can have any shape as determined by the alignment process.

First pixels 1201 falling outside second field of view (e.g., first pixels 1201 in first clusters 1211*a* and 1211*b*) can be marked as non-intersecting. Each intersecting first pixel 1201 can be linked with a two-dimensional area corresponding to an associated second pixel cluster.

For example, first pixel 1201*a* has first coordinates (m, n). First pixel 1201 can be mapped to a shape drawn about the perimeter of second pixel group 1311*a*. Here, the perimeter would be represented by the following segments (e.g., vectors) expressed in second coordinates: (0, 0)-(2, 0); (2, 0)-(2, 2); ((2, 2)-(1,2); (1, 2)-(0, 3); (0, 3)-(0, 0).

Map 461 enables first pixels 1201 to be composited with second pixels 1301 during the recomposing process. According to some examples, mobile device 100 generates user-composed image 431 and displayed image 441 based on map 461.

For example, and referring to FIG. 12, first displayed field of view 442*a* could be expressed in the first coordinate system as: (0, 0)-(m−1, 0); (m−1, 0)-(m−1, n−1); (m−1, n−1)-(0, n−1); (0, n−1)-(0, 0). After determining how first displayed field of view 442*a* maps to first image 411, mobile device 100 can determine whether any first pixels 1201 in first displayed field of view 442*a* are intersecting (i.e., overlapping). Mobile device 100 can apply this information to render displayed image 441, as discussed with reference to FIG. 9.

FIG. 12 shows second displayed field of view 442*b*, which now includes first pixel cluster 1211*c*. With respect to second displayed field of view, 442*b*, only first pixels 1201 in first pixel cluster 1211*c* are overlapping. Thus, second displayed field of view 442*b* can be divided into two portions: a first portion encompasses non-overlapping first pixels 1201 and a second portion encompasses overlapping first pixels 1211*c*.

Mobile device 100 can apply this information to render displayed image 441, as discussed with reference to FIG. 9. If sampling from second image 421, mobile device 100 can apply map 461 to determine which second pixels 1301 correspond to the intersecting portion of second displayed field of view 442*b*.

As the user recomposes user-composed image 431 and/or displayed image 441 mobile device 100 can recompose the mapping. For example, imagine that the user wished to recompose from second user-composed image 431*b* (FIG. 6) to first user-composed image 431*a* (FIG. 5). Upon accessing third user-composed image 431*c*, mobile device 100 can map second user-composed image 431*b* to first and second images 411, 421.

More specifically, mobile device 100 can map the second user-composed field of view 432*b* to first and second images 411, 421, then apply the sourcing techniques of FIG. 9 to populate the second user-composed field of view 432*b* with pixels derived from first and second images 411, 421. When the user settles on the first field of view 432*a* of first user-composed image 431*a*, mobile device 100 can recompose the mapping, then reapply the sourcing techniques of FIG. 9 to populate first user-composed field of view 431*a* with pixels derived from first and second images 411, 421.

Instead of determining how first user-composed field of view 432 maps to first and second images 411, 421 from scratch, mobile device 100 can record the user manipulations that resulted in first user-composed field of view 432*a*, net the user manipulations, and set first user-composed field of view as equal second user-composed field of view 432*b* plus the net manipulations.

For example, imagine that first user-composed field of view 431*a* represents a one-thousand unit rightward pan from second user-composed field of view 432*a* (e.g., units of global coordinate system G). If the user panned rightward two-thousand units, then leftward one-thousand units, the net manipulation would be one-thousand units rightward. Mobile device 100 could then calculate first user-composed field of view 432*a* by adding one-thousand units to the X-axis coordinates of second user-composed field of view 432*b*.

Part 9

As previously discussed, first and second images 411, 421 can each be stored as a matrix, where each cell in the matrix includes a three dimensional color vector. The matrix can further be stored in compressed form via lossy or lossless compression. Even with compression, the matrix can consume a large amount of memory.

Map 461 enables user-composed image 441 to be losslessly stored as a reference matrix. When stored this way, user-composed image 441 can have the same post-rendering resolution as first image 411 and/or second image 412, but consume less than $\frac{1}{10}$ of the storage space (and in some cases less than $\frac{1}{100}$ of the storage space).

Upon accessing the reference matrix, mobile device 100 can dynamically compute the color vectors of individual pixels by re-sampling first image 411 and second image 421. After doing so, mobile device 100 can create a temporary copy of user-composed image 441 (e.g., on volatile memory). After the user exits gallery mode, mobile device 100 can purge the temporary copy from memory.

Figure 14:
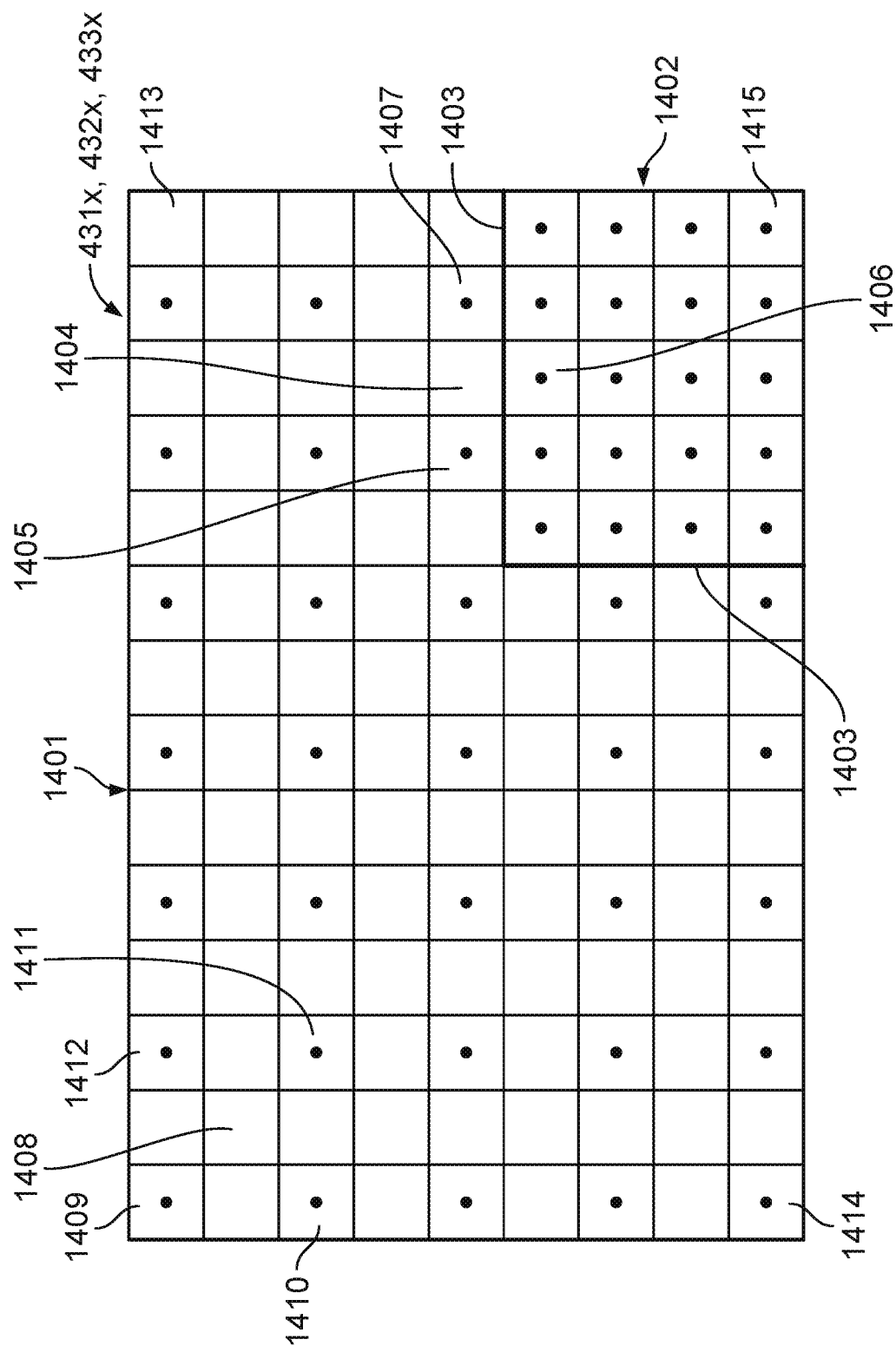
FIG. 14 is a schematic view of a user-composed image from the perspective of a global coordinate system.

FIG. 14 shows an example user-composed image 431*x* temporarily stored as a two-dimensional matrix of three-dimensional vectors (i.e., in non-reference matrix form). User-composed image 431*x* has a user-composed field of view 432*x* and a user-composed level of zoom 433*x*. User-composed field of view 432*x* includes a first area 1401 and a second area 1402. Boundary 1403 separates the two areas.

Second area 1402 intersects both first field of view 412 and second field of view 422. First area 1401 only intersects first field of view 412. As such, mobile device 100 has derived pixels in first area 1401 only from first image 411. Mobile device 100 has applied the above-discussed sourcing operations of FIG. 9 to determine whether pixels in second area 1402 should be sourced from first image 411 or second image 421.

In the example of FIG. 14, user-composed level of zoom 433*x* is second level of zoom 423. As such, pixels in second area 1402 have been derived from second image 421. The black dots indicate derived pixels. Because user-composed level of zoom 433*x* exceeds first level of zoom 413, only some pixels in first area 1401 were derived from first image 411. These pixels are dotted.

The remaining non-dotted pixels in first area 1401 were interpolated (as discussed with reference to the sourcing operations of FIG. 9) based on the color values in neighboring pixels. For example, the color vector of pixel 1404 could have been interpolated based on the color vectors in pixels 1405, 1406, and 1407. The color vector of pixel 1408 could have been interpolated based on color vectors in pixels 1409-1412.

User-composed image 431 can be stored as a reference matrix (e.g., metadata). The reference matrix can include (a) global coordinates of the user-composed field of view, (b) a value of the user-composed level of zoom, (c) the identities and coordinates of post-processing effects, (d) the identity of the specific global coordinate system, since map 461 can include a plurality of global coordinate systems, (e) the identity of first image 411, and (f) the identity of second image 421.

Because mobile device 100 can apply first and second images 411, 421 to re-render user-composed image 431, the reference matrix can represent a superposition of first image 411 with second image 421, plus any post-processing effects.

Let G(x, y) be a nonlinear transformation from unique coordinate system y (e.g., the first or second coordinate system) to global coordinate system G. G(x, y) can include rectification. Thus, G(first image 411, first coordinate system) can perform shifts, warps, and/or shifts to place first image 411 in global coordinate system G. Similarly, G(second image 421, second coordinate system) can perform shifts, warps, and/or shifts to place first image 421 in global coordinate system G.

According to some examples, the coordinate system of first image 411 (i.e., the first coordinate system) is used as the global coordinate system such that: G(first image 411, first coordinate system)=first image 411 in the first coordinate system.

User-composed field of view 432 can be stored in terms of the global coordinate system. Let matrix M be a matrix of coordinates (e.g., points or vectors) expressing user-composed field of view 432 in terms of the global coordinate system:

$$M = \begin{bmatrix} (x_1, y_1) & (x_2, y_2) \\ (x_3, y_3) & (x_4, y_4) \end{bmatrix}.$$

According to this example, each (x, y) coordinate pair represents a corner of user-composed field of view 432. According to another example, each coordinate pair can represent a two-dimensional vector marking an outer boundary of user-composed field of view 432. In the example of FIG. 14, matrix M $$M = \begin{bmatrix} \text{pixel 1409 coordinates} & \text{pixel 1413 coordinates} \\ \text{pixel 1414 coordinates} & \text{pixel 1415 coordinates} \end{bmatrix}.$$

Let $G^{-1}(x, y)$ be a nonlinear transformation from the global coordinate system to the unique coordinate system y (e.g., the first or second coordinate system). Thus, $G^{-1}$(M, first coordinate system) transforms user-composed field of view 432 into the first coordinate system. Similarly, $G^{-1}$(M, second coordinate system) transforms user-composed field of view 432 into the second coordinate system. Map 461 can include both G and $G^{-1}$.

As such, mobile device 100 can re-render any particular user-composed image 431 from reference matrix RM: RM= (M, user-composed level of zoom 433, photoeffects). As discussed above, the reference can further include an identity of the global coordinate system, an identity of first image 411 (e.g., a file name), and an identity of second image (e.g., a file name).

Figure 15:
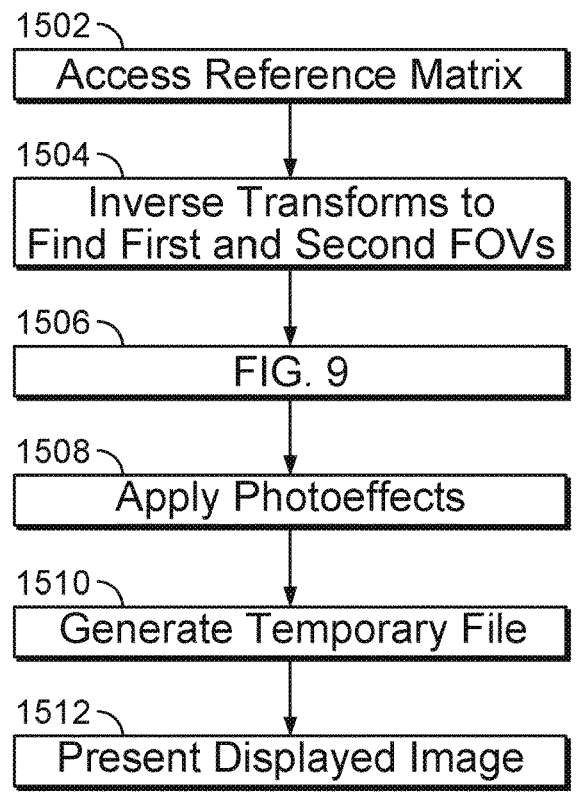
FIG. 15 is a block diagram of an example method.

FIG. 15 is an exemplary block diagram of a series of operations (e.g., a method) for applying a reference matrix. The operations of FIG. 15 can occur during the blocks of FIG. 11.

Blocks 1502-1512 can occur during block 1122 of FIG. 11. At block 1502, mobile device 100 can access the reference matrix of user-composed image 431. Upon accessing the reference matrix, mobile device 100 can inversely transform coordinates M to the first coordinate system and the second coordinate system at block 1504. $G^{-1}$(M, first coordinate system) places user-composed field of view 432 in first coordinates. $G^{-1}$(M, second coordinate system) places user-composed field of view 432 in second coordinates.

In the example of FIG. 14, first area 1401 falls outside second field of view 422. Thus, $G^{-1}$(area 1401, second coordinate system) can return null values, while $G^{-1}$(area 1402, second coordinate system) expresses area 1402 in terms of the second coordinate system.

At block 1506, mobile device 100 can apply the sourcing operations of FIG. 9 (which includes interpolation if needed to fill in missing pixels). At block 1508, mobile device 100 can apply the photoeffects listed in reference matrix RM to generate a final stage of user-composed image 431. Each of the listed photoeffects can be a matrix listing any initial conditions needed to apply the photoeffect (e.g., kind of photoeffect, two-dimensional coordinates of photoeffect, degree of photoeffect).

At block 1510, mobile device 100 can temporarily save a rendered copy of user-composed image 431 in memory (e.g., volatile memory) as a two-dimensional matrix of three-dimensional color vectors. At block 1512, mobile device 100 can present displayed image 441 based on the temporarily saved user-composed image 431 using the above-described techniques.

Referring to FIG. 11, and at block 1128, mobile device 100 can recompose user-composed image 431 and/or displayed image 441 depending on the selected mode. To present displayed image 441, mobile device 100 can rely on the temporarily saved user-composed image 431. At block 1134, mobile device 100 can erase the temporarily stored user-composed image 431. When rewriting user-composed image 431x, mobile device 100 can generate a new reference matrix.

According to some examples, mobile device 100 can preserve a plurality of reference matrices and thus does not necessarily perform a rewrite at block 1134. Referring to the table below, each recomposition of user-composed image 431 can be stored as a new entry in history 471 (not shown are the other possible features of each reference matrix such as identity of global coordinate system G):

| | History | | |
|---|---|---|---|
| | | Reference Matrices | |
| Entry No. | User-Composed Field of View | User-Composed Level of Zoom | Photoeffects |
| 0 | M-0 | Zoom-0 | Photoeffect(s)-0 |
| 1 | M-1 | Zoom-1 | Photoeffect(s)-1 |
| 2 | M-2 | Zoom-2 | Photoeffect(s)-2 |
| 3 | M-3 | Zoom-3 | Photoeffect(s)-3 |
| n | M-n | Zoom-n | Photoeffect(s)-n |

Thus, instead of storing user-composed image 431 independent of history 471, as shown in FIG. 4, user-composed image 431 can be stored as the latest entry (in this case Entry No. n) in history 471. Mobile device 100 can include an option to present history 471 and enable user selection of any Entry No. to revert user-composed image 431 to a previous layout. Mobile device 100 can include an option to render any entry in history 471 to have a two-dimensional matrix of cells populated with three-dimensional color vectors.

Mobile device 100 can include an API that enables access to user-composed image 431 by other programs on mobile device 100 (e.g., an email program, a text message programs). When calling user-composed image 431 through the API, mobile device 100 can automatically render user-composed image 431 and supply the rendered copy to the requesting program.

Part 10

Figure 16:
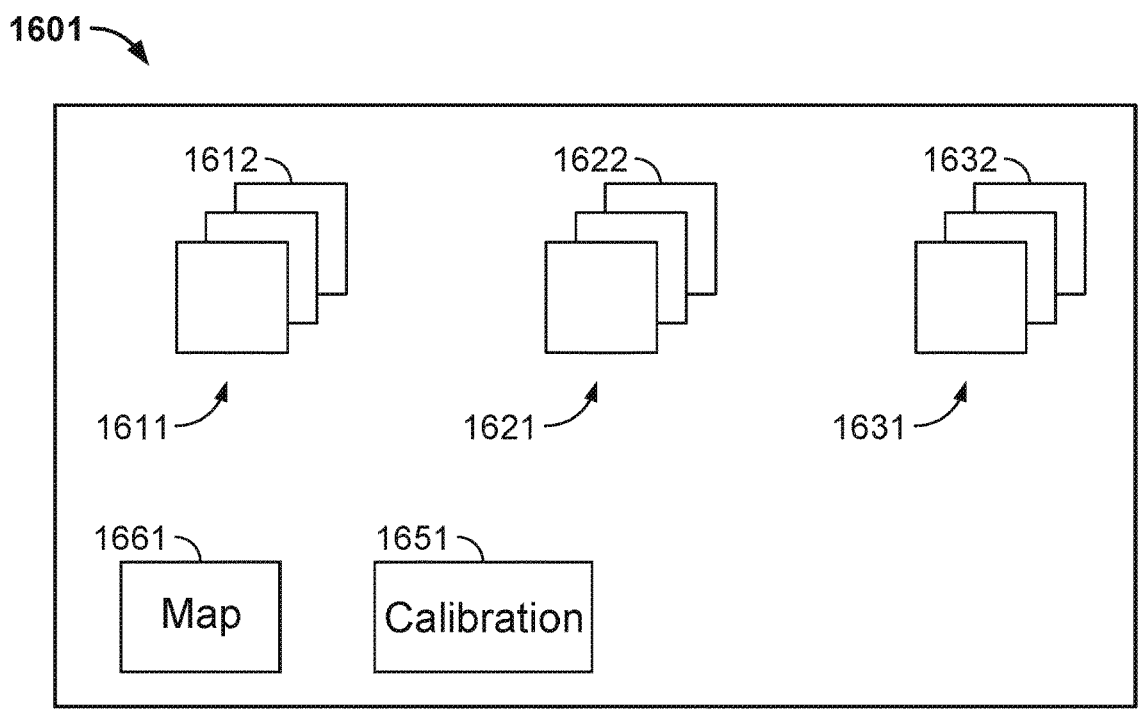
FIG. 16 is a block diagram of electronic files.

FIG. 16 shows a video package 1601 including first video 1611, a second video 1621, a user-composed video 1631, calibration 1651, and a map 1661. First video 1611 can include a plurality of first frames 1612, each of which can be a different first image 411. Second video 1621 can include a plurality of second frames 1622, each of which can be a different second image 421. User-composed video can include a plurality of user-composed frames 1632, each of which can be a different user-composed image 431.

Map 1661 can include a plurality of different maps, each applying to one or more frames of first video 1611, one or more frames of second video 1621, and one or more frames of user-composed video 1631. Map 1661 can be constructed with calibration 1651 as previously discussed with respect to map 461 and calibration 451.

Figure 16A:
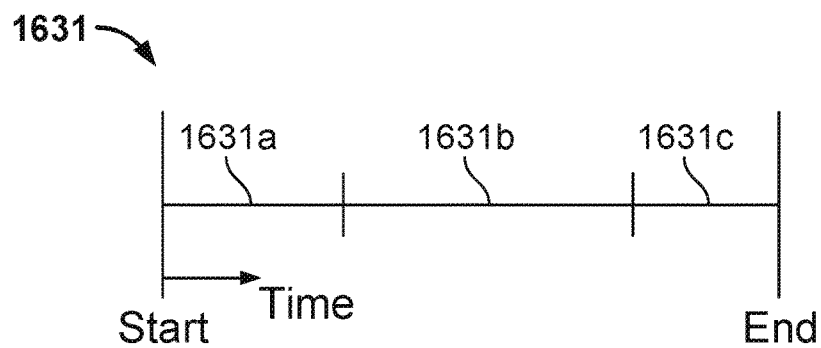
FIG. 16A shows a partitioned user-composed video.

As shown in FIG. 16A, mobile device 100 can enable user-selected partitioning of user-composed video into a plurality of segments 1601. Here, the user has partitioned user-composed video 1631 into first, second, and third segments 1631a, 1631b, and 1631c. The length of each segment and the total number of segments can be user-selectable.

Mobile device 100 can enable the user to independently select a user-composed field of view, a user-composed level of zoom, and one or more photoeffects for each segment. Alternatively, mobile device 100 can enable the user to independently select a user-composed field of view and one or more photoeffects for each segment, and then automatically apply a level of zoom. Doing so enables mobile device 100 to maintain every frame of user-composed video 1631 at a uniform resolution.

Mobile device 100 can store user-composed video 1631 as a table with a plurality of entries. An example table is shown below:

| Entry No. | User-Composed Field of View | User-Composed Level of Zoom | Photoeffects | Map | Reference Frame of First Video | Reference Frame of Second Video |
|---|---|---|---|---|---|---|
| 0 | M-0 | Zoom-0 | Photoeffect(s)-0 | $G_0(x)$ | 0 | 0 |
| 1 | M-1 | Zoom-1 | Photoeffect(s)-1 | $G_1(x)$ | 1 | 1 |
| n | M-n | Zoom-n | Photoeffect(s)-n | $G_n(x)$ | n | n |

Each entry number can correspond to a frame of user-composed video 1631. Each entry can include a frame reference matrix having the following items: (a) a user-composed field of view; (b) a user-composed level of zoom; (c) one or more photoeffects; (d) a global coordinate transform function (and an inverse global coordinate transform function—not shown); (e) a reference frame of first video 1611 and a reference frame of second video 1621.

Items (a), (b), and (c) can function as described above with reference to FIGS. 14 and 15. With respect to item (d), each user-composed frame can be associated with a different global transform function $G(x)$ and thus a different inverse global transform function $G^{-1}(x)$. Items (e) and (f) describe which frames of first and second videos 1611, 1621 to reference when rendering a particular user-composed frame. Although each pair of items (e) and (f) have identical values in the above table, other examples can have different values for each pair of items (e) and (f). This would be advantageous if the first and second videos had different frame rates.

To play user-composed video 1631, mobile device 100 can present a plurality of displayed frames. Each displayed frame can be rendered based on a corresponding user-composed frame in the same way that displayed image 441 can be rendered based on user-composed image 431.

Mobile device 100 can be configured to render user-composed video 1631 into a known video format (e.g., an AVI format). When an external program (e.g., an email program, a text messaging program) calls user-composed video 1631 via the above-discussed API, the API can automatically render user-composed video 1631 into the typical video format. A typical video format can store each frame as a two-dimensional matrix of cells, each cell corresponding to a different pixel, and each cell having a three-dimensional color vector. A typical video format can store compressed versions of these frames. By storing video 1631 as a plurality of entries, as opposed to a traditional format, mobile device 100 can conserve storage space.

Part 11

Mobile device 100 can be a smartphone, a tablet, a digital camera, or a laptop. Mobile device 100 can be an Android® device, an Apple® device (e.g., an iPhone®, an iPad®, or a Macbook®), or Microsoft® device (e.g., a Surface Book®, a Windows® phone, or Windows® desktop). Mobile device 100 can be representative of a non-mobile device, such as a vehicle, or a desktop computer (e.g., a computer server).

Figure 17:
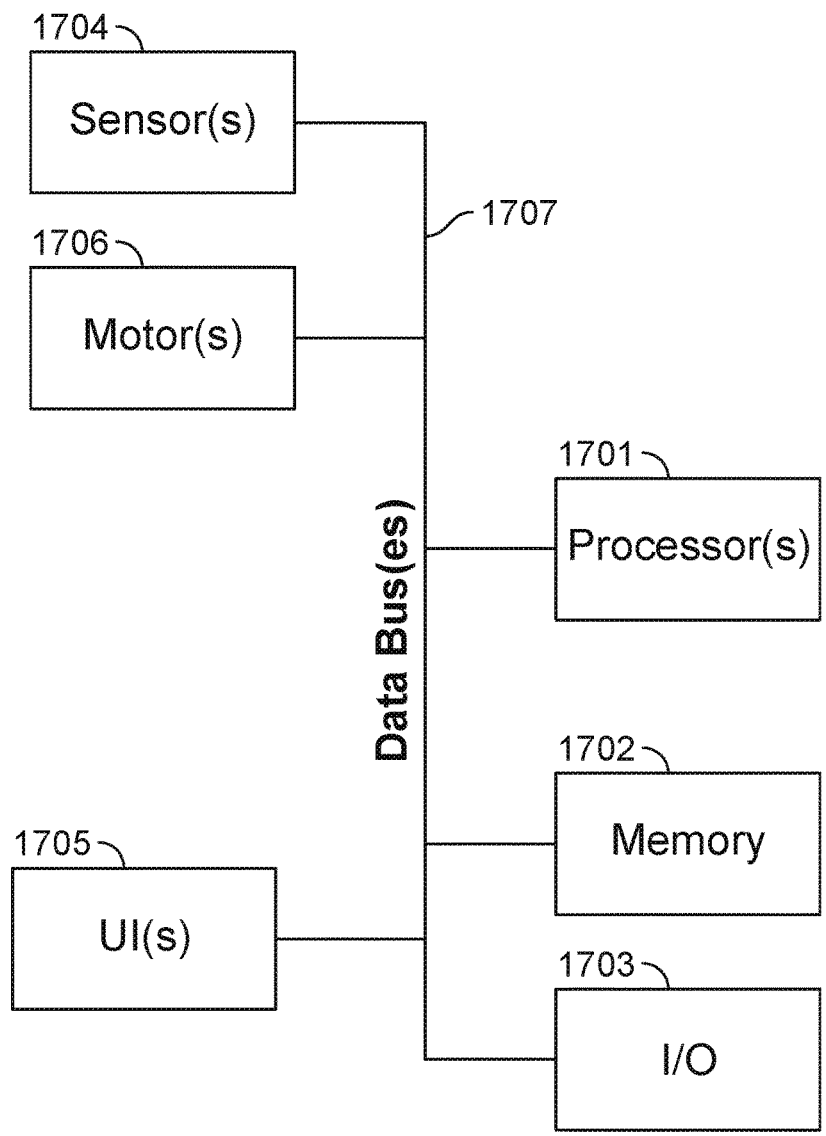
FIG. 17 is a block diagram of a processing system.

As shown in FIG. 17, mobile device 100 can include a processing system 1700. Processing system 1700 can include one or more processors 1701, memory 1702, one or more input/output devices 1703, one or more sensors 1704, one or more user interfaces 1705, one or more motors/actuators 1706, and one or more data buses 1707.

Processors 1701 can include one or more distinct processors, each having one or more cores. Each of the distinct processors can have the same or different structure. Processors 1701 can include one or more central processing units (CPUs), one or more graphics processing units (GPUs), application specific integrated circuits (ASICs), digital signal processors (DSPs), and the like.

Processors 1701 are configured to perform a certain function or operation at least when one of the one or more of the distinct processors is capable of executing code, stored on memory 1702 embodying the function or operation. Processors 1701 can be configured to perform any and all functions, methods, and operations disclosed herein.

Memory 1702 can include volatile memory, non-volatile memory, and any other medium capable of storing data. Each of the volatile memory, non-volatile memory, and any other type of memory can include multiple different memory devices, located at a multiple distinct locations and each having a different structure.

Examples of memory 1702 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine readable code saved in memory 1702.

Input-output devices 1703 can include any component for trafficking data such as ports and telematics. Input-output devices 1703 can enable wired communication via USB®, DisplayPort®, HDMI®, Ethernet, and the like. Input-output devices 1703 can enable electronic, optical, magnetic, and holographic, communication with suitable memory 1703. Input-output devices can enable wireless communication via WiFi®, Bluetooth®, cellular (e.g., LTE®, CDMA®, GSM®, WiMax®, NFC®), GPS, and the like.

Sensors 1704 can capture physical measurements of environment and report the same to processors 1701. Sensors 1704 can include first camera 105 and second camera 106. Each of first camera 105 and second camera 106 can include one or more lenses, one or more apertures, and one or more photodiode panels arranged along an optical axis. The one or more photodiode panels can capture photometrics of incident light, which processors 1701 can convert into image files. First camera 105 can include a wide-angle lens and second camera 106 can include a telephoto lens.

User interface 1705 can enable user interaction with imaging system 100. User interface 1705 can include displays (e.g., OLED touchscreens, LED touchscreens), physical buttons, speakers, microphones, keyboards, and the like. User interface 1705 can include display 102 and physical button 103.

Motors/actuators 1706 can enable processor 1701 to control mechanical or chemical forces. If either first or second camera 105, 106 includes auto-focus, motors/actuators 1706 can move a lens along its optical axis to provide auto-focus. Data bus 1707 can traffic data between the components of processing system 1700. Data bus 1707 can include conductive paths printed on, or otherwise applied to, a substrate (e.g., conductive paths on a logic board), SATA cables, coaxial cables, USB® cables, Ethernet cables, copper wires, and the like. Data bus 1707 can be conductive paths of a logic board to which processor 1701 and the volatile memory are mounted. Data bus 1707 can include a wireless communication pathway. Data bus 1707 can include a series of different wires 1707 (e.g., USB® cables) through which different components of processing system 1700 are connected.

We claim:

1. A method for image processing, comprising:
   receiving a first image of a scene captured by a first camera, the first image comprising first pixels and having a first field of view;
   receiving a second image of the scene captured by a second camera, the second image comprising second pixels and having a second field of view;
   generating a depth map based on one or more of the first image and the second image;
   storing, in response to a first command, a first user-composed image of the scene, the first user-composed image comprising first user-composed pixels and having a user-composed field of view, and the first user-composed pixels being derived from the first pixels based on determining that an area of the user-composed field of view intersects with the first field of view;
   storing, in response to the first command, the generated depth map;
   receiving a second command to edit the first user-composed image;
   editing, in response to the second command, the first user-composed image based on the stored depth map;
   saving the edited first user-composed image as a second user-composed image;
   receiving a third command to change the field of view of the second user-composed image;
   storing, in response to the third command, a third user-composed image of the scene, the third user-composed image comprising second user-composed pixels and having a second user-composed field of view, and the second user-composed pixels being derived from the second pixels based on determining that an area of the second user-composed field of view intersects with the second field of view; and
   editing, in response to the third command, the third user-composed image based on the stored depth map.

2. The method of claim 1, comprising:
   deriving a displayed image from the first user-composed image;
   presenting the displayed image;
   wherein the second command comprises at least one command to adjust the displayed image;
   wherein editing the first user-composed image comprises:
   automatically deriving third user-composed pixels for the second user-composed image based on the stored depth map in response to the at least one command.

3. The method of claim 1, wherein the second field of view is disposed within the first field of view.

4. The method of claim 3, wherein the first user-composed image comprises pixels derived from the first image.

5. The method of claim 3, wherein the first user-composed image comprises pixels derived from the first pixels, and the first user-composed image does not comprise pixels derived from the the second pixels; and
   wherein a pixel in the second user-composed image is derived from one or more of the first pixels and one or more of the second pixels.

6. The method of claim 1, wherein editing the first user-composed image comprises deriving third user-composed pixels for the second user-composed image from both the first pixels and the second pixels without displaying the first image and without displaying the second image.

7. The method of claim 6, wherein:
   (a) both the first image and the second image are rectified to a global plane, or
   (b) the first image and the second image are not rectified to a global plane and deriving the second user-composed pixels from the second pixels comprises accessing the second image through one or more spatial transforms.

8. The method of claim 1, wherein editing the first user-composed image comprises:
   receiving a photoeffect selection; and
   in response to the photoeffect selection, applying a photoeffect to the first user-composed image based on the generated depth map.

9. The method of claim 8, wherein the first user-composed image comprises pixels derived from the first pixels but does not comprise pixels derived from the second pixels and due to the photoeffect, the second user-composed image comprises pixels derived from the first pixels and the second pixels.

10. The method of claim 1, comprising:
receiving a fourth command to save the edited first user-composed image;
saving the edited first user-composed image as the second user-composed image in response to the fourth command;
deleting the first user-composed image in response to the third command.

11. The method of claim 1 wherein editing the first user-composed image comprises changing a Bokeh effect applied to the first user-composed image based on the generated depth map.

12. The method of claim 1 wherein editing the first user composed image comprises:
receiving a selection of a first item in the first user-composed image;
estimating, in response to the selection of the first item, a depth of field range of the first item based on the generated depth map; and
performing operations that blur a second item in the first user-composed image that is outside the estimated depth of field range.

13. The method of claim 12, further comprising:
determining that the first item is in the first image but not the second image; and
applying a one-dimensional and non-stereoscopic technique to generate the depth map to include the first item.

14. The method of claim 1, wherein the generating comprises generating the depth map based on the first image and the second image.

15. The method of claim 1, wherein storing the generated depth map comprises storing the generated depth map in non-volatile memory.

16. The method of claim 1, wherein editing the first user-composed image comprises adjusting a depth of field effect.

17. A processing system comprising:
a memory; and
one or more processors configured to:
receive a first image of a scene captured by a first camera, the first image comprising first pixels and having a first field of view;
receive a second image of the scene captured by a second camera, the second image comprising second pixels and having a second field of view;
generate a depth map based on one or more of the first image and the second image;
store, in response to a first command, a first user-composed image of the scene, the first user-composed image comprising first user-composed pixels and having a user-composed field of view, and the first user-composed pixels being derived from the first pixels based on determining that an area of the user-composed field of view intersects with the first field of view;
store, in response to the first command, the generated depth map;
receive a second command to edit the first user-composed image;
edit, in response to the second command, the first user-composed image based on the stored depth map;
save the edited first user-composed image as a second user-composed image;
receive a third command to change the field of view of the second user-composed image;
store, in response to the third command, a third user-composed image of the scene, the third user-composed image comprising second user-composed pixels and having a second user-composed field of view, and the second user-composed pixels being derived from the second pixels based on determining that an area of the second user-composed field of view intersects with the second field of view; and
edit, in response to the third command, the third user-composed image based on the stored depth map.

18. The processing system of claim 17, wherein the one or more processors are configured to:
derive a displayed image from the first user-composed image;
present the displayed image;
edit the first user-composed image by:
automatically deriving third user-composed pixels for the second user-composed image based on the generated depth map in response to at least one command to adjust the displayed image, the second command comprising the at least one command.

19. The processing system of claim 17, wherein the second field of view is disposed within the first field of view.

20. The processing system of claim 19, wherein the first user-composed image comprises pixels derived from the first image.

21. The processing system of claim 19, wherein the first user-composed image comprises pixels derived from the first pixels, and the first user-composed image does not comprise pixels derived from the second pixels; and
wherein a pixel in the second user-composed image is derived from one or more of the first pixels and one or more of the second pixels.

22. The processing system of claim 17, wherein the one or more processors are configured to edit the first user-composed image by:
deriving third user-composed pixels for the second user-composed image from both the first pixels and the second pixels without causing the first image to be displayed and without causing the second image to be displayed.

23. The processing system of claim 17, wherein the one or more processors are configured to:
receive a fourth command to save the edited first user-composed image;
save the edited first user-composed image as the second user-composed image in response to the fourth command;
delete the first user-composed image in response to the third command.

24. The processing system of claim 17, further comprising a first camera and a second camera, wherein the one or more processors are configured to:
command the first camera to capture the first image in response to the first command;
command the second camera to capture the second image in response to the first command;
derive the first user-composed pixels in response to the first command.

25. The processing system of claim 17, wherein the one or more processors are configured to edit the first user-composed image by changing a Bokeh effect applied to the first user-composed image based on the generated depth map.

26. The processing system of claim 25, wherein the one or more processors are configured to edit the first user-composed image by:
  determining that the first item is in the first image but not the second image; and
  applying a one-dimensional and non-stereoscopic technique to generate the depth map to include the first item.

27. The processing system of claim 17, wherein the one or more processors are configured to edit the first user-composed image by:
  receiving a selection of a first item in the first user-composed image;
  estimating, in response to the selection of the first item, a depth of field range of the first item based on the generated depth map; and
  blurring a second item in the first user-composed image that is outside the estimated depth of field range.

28. The processing system of claim 17, wherein the one or more processors are further configured to generate the depth map based on the first image and the second image.

29. The processing system of claim 17, wherein the one or more processors are further configured to store the generated depth map in non-volatile memory.

30. The processing system of claim 17, wherein the one or more processors are further configured to edit the first user-composed image by adjusting a depth of field effect.

31. A non-transitory computer-readable medium comprising program code, which, when executed by one or more processors, causes the one or more processors to perform operations, the program code comprising code for:
  receiving a first image of a scene captured by a first camera, the first image comprising first pixels and having a first field of view;
  receiving a second image of the scene captured by a second camera, the second image comprising second pixels and having a second field of view;
  generating a depth map based on one or more of the first image and the second image;
  storing, in response to a first command, a first user-composed image of the scene, the first user-composed image comprising first user-composed pixels and having a user-composed field of view, and the first user-composed pixels being derived from the first pixels based on determining that an area of the user-composed field of view intersects with the first field of view;
  storing, in response to the first command, the generated depth map;
  receiving a second command to edit the first user-composed image;
  editing the first user-composed image based on the stored depth map;
  saving the edited first user-composed image as a second user-composed image;
  receiving a third command to change the field of view of the second user-composed image;
  storing, in response to the third command, a third user-composed image of the scene, the third user-composed image comprising second user-composed pixels and having a second user-composed field of view, and the second user-composed pixels being derived from the second pixels based on determining that an area of the second user-composed field of view intersects with the second field of view; and
  editing, in response to the third command, the third user-composed image based on the stored depth map.

32. The non-transitory computer-readable medium of claim 31, wherein the program code further comprises code for generating the depth map based on the first image and the second image.

33. The non-transitory computer-readable medium of claim 23, wherein the program code further comprises code for storing the generated depth map in non-volatile memory.

34. The non-transitory computer-readable medium of claim 23, wherein the program code further comprises code for editing the first user-composed image by adjusting a depth of field effect.

* * * * *